US007841937B2

(12) United States Patent
Okada

(10) Patent No.: US 7,841,937 B2
(45) Date of Patent: Nov. 30, 2010

(54) SLOT MACHINE

(75) Inventor: Kazuo Okada, Tokyo (JP)

(73) Assignee: Aruze Gaming America, Inc., Las Vegas, NV (US)

( * ) Notice: Subject to any disclaimer, the term of this patent is extended or adjusted under 35 U.S.C. 154(b) by 851 days.

(21) Appl. No.: 11/806,155

(22) Filed: May 30, 2007

(65) Prior Publication Data

US 2008/0139299 A1 Jun. 12, 2008

Related U.S. Application Data

(60) Provisional application No. 60/873,955, filed on Dec. 11, 2006.

(51) Int. Cl.
*G06F 17/00* (2006.01)

(52) U.S. Cl. ........................................................ 463/21

(58) Field of Classification Search .............. 463/16–25
See application file for complete search history.

(56) References Cited

U.S. PATENT DOCUMENTS

| | | | | |
|---|---|---|---|---|
| 6,604,999 | B2 | 8/2003 | Ainsworth | |
| 6,960,133 | B1 * | 11/2005 | Marks et al. | 463/20 |
| 7,736,225 | B2 * | 6/2010 | Okada | 463/20 |
| 2002/0065124 | A1 | 5/2002 | Ainsworth | |
| 2005/0137037 | A1 * | 6/2005 | Tucker | 473/513 |
| 2008/0090655 | A1 * | 4/2008 | Marks et al. | 463/29 |
| 2009/0124325 | A1 * | 5/2009 | Wadleigh et al. | 463/20 |
| 2009/0124375 | A1 * | 5/2009 | Patel | 463/29 |

FOREIGN PATENT DOCUMENTS

| | | |
|---|---|---|
| JP | 2002-078855 | 3/2002 |

* cited by examiner

*Primary Examiner*—Ronald Laneau
(74) *Attorney, Agent, or Firm*—NDQ&M Watchstone LLP

(57) ABSTRACT

When a start condition of a payout variable game is fulfilled during a base game, depending on number of award-not-accompanied occurrence times of a specific symbol combination selected by a player at the beginning payout variable game to be executed a predetermined number of times at maximum, a number of credits to be paid out to an award-accompanied occurrence of the specific symbol combination during the payout variable game is varied depending on number of award-not-accompanied occurrence times of the specific symbol combination. Alternatively, a number of credits to be paid out at a termination of the payout variable game is varied depending on number of award-accompanied occurrence times of the specific symbol combination.

13 Claims, 25 Drawing Sheets

FIG. 3

| | 28a | 28b | 28c | 28d | 28e |
|---|---|---|---|---|---|
| CODE NO. | SYMBOL | SYMBOL | SYMBOL | SYMBOL | SYMBOL |
| 00 | JACKPOT 7 | JACKPOT 7 | JACKPOT 7 | JACKPOT 7 | JACKPOT 7 |
| 01 | PLUM | BELL | CHERRY | ORANGE | APPLE |
| 02 | ORANGE | APPLE | ORANGE | PLUM | ORANGE |
| 03 | PLUM | BELL | APPLE | STRAWBERRY | BELL |
| 04 | LOBSTER | CHERRY | ORANGE | BELL | PLUM |
| 05 | PLUM | LOBSTER | PLUM | PLUM | BLUE 7 |
| 06 | ORANGE | PLUM | LOBSTER | APPLE | ORANGE |
| 07 | PLUM | CHERRY | PLUM | BLUE 7 | APPLE |
| 08 | BLUE 7 | BELL | ORANGE | PLUM | PLUM |
| 09 | CHERRY | APPLE | PLUM | ORANGE | BELL |
| 10 | ORANGE | BELL | ORANGE | BELL | CHERRY |
| 11 | BELL | STRAWBERRY | PLUM | LOBSTER | PLUM |
| 12 | ORANGE | PLUM | BELL | PLUM | CRAB |
| 13 | STRAWBERRY | BLUE 7 | STRAWBERRY | CHERRY | ORANGE |
| 14 | BLUE 7 | BELL | BLUE 7 | APPLE | APPLE |
| 15 | ORANGE | APPLE | BELL | STRAWBERRY | PLUM |
| 16 | APPLE | BELL | CHERRY | CRAB | CHERRY |
| 17 | CRAB | STRAWBERRY | CRAB | BELL | LOBSTER |
| 18 | ORANGE | CRAB | ORANGE | PLUM | BELL |
| 19 | PLUM | CHERRY | PLUM | ORANGE | ORANGE |
| 20 | BLUE 7 | BELL | ORANGE | CHERRY | PLUM |
| 21 | CHERRY | APPLE | PLUM | PLUM | STRAWBERRY |

FIG. 4A

| 28a | 28b | 28c | 28d | 28e | PAYOUT | WINNING POSSIBILITY (%) |
|---|---|---|---|---|---|---|
| APPLE | APPLE | APPLE | APPLE | APPLE | BONUS GAME+25 COINS | 0.5 |
| LOBSTER | LOBSTER | LOBSTER | LOBSTER | LOBSTER | 25 COINS | 0.8 |
| BELL | BELL | BELL | BELL | BELL | 25 COINS | 0.8 |
| CHERRY | CHERRY | CHERRY | CHERRY | CHERRY | 20 COINS | 1.1 |
| BLUE 7 | BLUE 7 | BLUE 7 | BLUE 7 | BLUE 7 | 20 COINS | 1.1 |
| STRAWBERRY | STRAWBERRY | STRAWBERRY | STRAWBERRY | STRAWBERRY | 10 COINS | 1.5 |
| ORANGE | ORANGE | ORANGE | ORANGE | ORANGE | 10 COINS | 1.5 |
| CRAB | CRAB | CRAB | CRAB | CRAB | 5 COINS | 3.0 |
| PLUM | PLUM | PLUM | PLUM | PLUM | 5 COINS | 3.0 |
| JACKPOT 7 | JACKPOT 7 | JACKPOT 7 | JACKPOT 7 | JACKPOT 7 | JACKPOT+25 COINS | 0.1 |
| SIX "BELL" SYMBOLS | | | | | 3 COINS | 7.5 |
| ⋮ | | | | | | |

FIG. 4B

| 28a | 28b | 28c | 28d | 28e | PAYOUT |
|---|---|---|---|---|---|
| APPLE | APPLE | APPLE | APPLE | APPLE | BONUS GAME+25×2M COINS |
| LOBSTER | LOBSTER | LOBSTER | LOBSTER | LOBSTER | 25×2M COINS |
| BELL | BELL | BELL | BELL | BELL | 25×2M COINS |
| CHERRY | CHERRY | CHERRY | CHERRY | CHERRY | 20×3M COINS |
| BLUE 7 | BLUE 7 | BLUE 7 | BLUE 7 | BLUE 7 | 20×3M COINS |
| STRAWBERRY | STRAWBERRY | STRAWBERRY | STRAWBERRY | STRAWBERRY | 10×5M COINS |
| ORANGE | ORANGE | ORANGE | ORANGE | ORANGE | 10×5M COINS |
| CRAB | CRAB | CRAB | CRAB | CRAB | 5×10M COINS |
| PLUM | PLUM | PLUM | PLUM | PLUM | 5×10M COINS |
| JACKPOT 7 | JACKPOT 7 | JACKPOT 7 | JACKPOT 7 | JACKPOT 7 | JACKPOT+25×2M COINS |
| SIX "BELL" SYMBOLS | | | | | 3×20M COINS |
| MINIMUM GUARANTEE FOR SPECIAL GAME | | | | | 2 COINS |
| ⋮ | | | | | |

FIG. 4C

| 28a | 28b | 28c | 28d | 28e | PAYOUT | WINNING POSSIBILITY (%) |
|---|---|---|---|---|---|---|
| APPLE | APPLE | APPLE | APPLE | APPLE | BONUS GAME+25 COINS | 0.5 |
| LOBSTER | LOBSTER | LOBSTER | LOBSTER | LOBSTER | 25 COINS | 0.8 |
| BELL | BELL | BELL | BELL | BELL | 25 COINS | 0.8 |
| CHERRY | CHERRY | CHERRY | CHERRY | CHERRY | 20 COINS | 1.1 |
| BLUE 7 | BLUE 7 | BLUE 7 | BLUE 7 | BLUE 7 | 20 COINS | 1.1 |
| STRAWBERRY | STRAWBERRY | STRAWBERRY | STRAWBERRY | STRAWBERRY | 10 COINS | 1.5 |
| ORANGE | ORANGE | ORANGE | ORANGE | ORANGE | 10 COINS | 1.5 |
| CRAB | CRAB | CRAB | CRAB | CRAB | 5 COINS | 3.0 |
| PLUM | PLUM | PLUM | PLUM | PLUM | 5 COINS | 3.0 |
| JACKPOT 7 | JACKPOT 7 | JACKPOT 7 | JACKPOT 7 | JACKPOT 7 | JACKPOT+25 COINS | 0.1 |
| SIX "BELL" SYMBOLS | | | | | SPECIAL GAME+3 COINS | 7.5 |
| ... | | | | | | |

FIG. 4D

| 28a | 28b | 28c | 28d | 28e | PAYOUT |
|---|---|---|---|---|---|
| APPLE | APPLE | APPLE | APPLE | APPLE | BONUS GAME+25×2S COINS |
| LOBSTER | LOBSTER | LOBSTER | LOBSTER | LOBSTER | 25×2S COINS |
| BELL | BELL | BELL | BELL | BELL | 25×2S COINS |
| CHERRY | CHERRY | CHERRY | CHERRY | CHERRY | 20×3S COINS |
| BLUE 7 | BLUE 7 | BLUE 7 | BLUE 7 | BLUE 7 | 20×3S COINS |
| STRAWBERRY | STRAWBERRY | STRAWBERRY | STRAWBERRY | STRAWBERRY | 10×5S COINS |
| ORANGE | ORANGE | ORANGE | ORANGE | ORANGE | 10×5S COINS |
| CRAB | CRAB | CRAB | CRAB | CRAB | 5×10S COINS |
| PLUM | PLUM | PLUM | PLUM | PLUM | 5×10S COINS |
| JACKPOT 7 | JACKPOT 7 | JACKPOT 7 | JACKPOT 7 | JACKPOT 7 | JACKPOT+25×2S COINS |
| SIX "BELL" SYMBOLS | | | | | SPECIAL GAME+3×20S COINS |
| MINIMUM GUARANTEE FOR SPECIAL GAME | | | | | 2 COINS |
| ⋮ | | | | | |

(SPINNING -STATE-SYMBOLS DISPLAY PROCESSING)

SLOT MACHINE

CROSS-REFERENCE TO THE RELATED APPLICATION (S)

This application is based upon and claims a priority from the U.S. Provisional Patent Application No. 60/873,955 filed on Dec. 11, 2006, the entire contents thereof are incorporated herein by reference for all purposes.

BACKGROUND OF THE INVENTION

1. Field of the Invention

The present invention relates to a slot machine which executes games using gaming media such as coins, bills, and the like.

2. Description of Related Art

As an example of a conventional slot machine, there has been known the one such as disclosed in U.S. Patent Publication No. 6604999B2 in which a payout is made for repositioning of a winning symbol combination on a pay line defined on a display or for repositioning of a predetermined number or more of predetermined identical symbols on the display.

Furthermore, in U.S. Patent Application Publication No. 6093102A, there is disclosed a slot machine which makes payout when a winning symbol combination is repositioned on a pay line of which pattern can be increased in number by player's selection.

The above-mentioned conventional slot machines make payout in accordance with a pre-defined payout rate of theirs payout tables. Accordingly, there has been desired the advent of a slot machine which has new entertainment properties.

SUMMARY OF THE INVENTION

According to a first aspect of the present invention, there is provided a slot machine comprising: a display which has plural display regions and displays symbol combinations every game by repositioning symbols that have been positioned in the plural display regions; and a controller which is programmed to operate with the display (a) to execute a symbol combination selecting game in which a specific symbol combination is selected from plural symbol combinations by means of an external input; (b) to execute a predetermined number of times of unit game after execution of the operation (a); and (c) when a payout variable game is executed by making use of the predetermined number of times of unit game which is being executed in accordance with the operation (b), (1) to vary a number of credits to be paid out to an award-accompanied occurrence of the specific symbol combination depending on number of award-not-accompanied occurrence times of the specific symbol combination, or (2) to vary a number of credits to be paid out at a termination of the, payout variable game depending on number of award-accompanied occurrence times of the specific symbol combination.

According to a second aspect of the present invention, there is provided a slot machine comprising: a display which has plural display regions and displays symbol combinations every game by repositioning symbols that have been positioned in the plural display regions; and a controller which is programmed to operate with the display (a) to execute a symbol combination selecting game in which a specific symbol combination is selected from plural symbol combinations by means of an external input; (b) to execute a predetermined number of times of unit game after execution of the operation (a); and (c) when a payout variable game is executed by making use of the predetermined number of times of unit game which is being executed in accordance with the operation (b), (1) to increase a number of credits to be paid out to the award-accompanied occurrence of the specific combination in proportion to increase in the number of award-not-accompanied occurrence times of the specific symbol combination, or (2) to increase a number of credits to be paid out at the termination of the payout variable game in proportion to increase in the number of award-accompanied occurrence times of the specific symbol combination.

According to a third aspect of the present invention, there is provided a slot machine comprising: a display which has plural display regions and displays symbol combinations every game by repositioning symbols that have been positioned in the plural display regions; and a controller which is programmed to operate with the display (a) to execute a symbol combination selecting game in which a specific symbol combination is selected from plural symbol combinations by means of an external input; (b) to execute a predetermined number of times of unit game after execution of the operation (a); (c) when a payout variable game is executed by making use of the predetermined number of times of unit game which is being executed in accordance with the operation (b), (1) to increase a number of credits to be paid out to the award-accompanied occurrence of the specific combination in proportion to increase in the number of award-not-accompanied occurrence times of the specific symbol combination, and (2) to terminate the payout variable game at time of the award-accompanied occurrence of the specific symbol combination, and (d) for executing the operation (c), (1) to provide various numerical valued possibility of award-accompanied occurrence for the plural symbol combinations and assign same numerical valued possibility of award-accompanied occurrence to two or more of symbol combinations among the plural symbol combinations, and (2) to reduce increasing rate with regard to a number of credits to be paid out to the award-accompanied occurrence of the plural symbol combination as an initial value is larger.

According to a fourth aspect of the present invention, there is provided a slot machine comprising: a display which has plural display regions and displays symbol combinations every game by repositioning symbols that have been positioned in the plural display regions; and a controller which is programmed to operate with the display (a) to execute a symbol combination selecting game in which a specific symbol combination is selected from plural symbol combinations by means of an external input; (b) to execute a predetermined number of times of unit game after execution of the operation (a); (c) when a payout variable game is executed by making use of the predetermined number of times of unit game which is being executed in accordance with the operation (b), (1) to increase a number of credits to be paid out to the award-accompanied occurrence of the specific combination in proportion to increase in the number of award-not-accompanied occurrence times of the specific symbol combination, and (2) to set payout a number of credits to be paid out at the termination of the payout variable game to predetermined minimum amount in case the number of award-accompanied occurrence times of the specific symbol combination is zero, and (d) for executing the operation (c), (1) to provide various numerical valued possibility of award-accompanied occurrence for the plural symbol combinations and assign same numerical valued possibility of award-accompanied occurrence to two or more of symbol combinations among the plural symbol combinations, and (2) to reduce increasing rate with regard to the number of credits to be paid out to the award-accompanied occurrence of the plural symbol combination as an initial value is larger.

BRIEF DESCRIPTION OF THE DRAWINGS

The accompanying drawings, which are incorporated in and constitute a part of this specification illustrate embodiments of the invention and, together with the description, serve to explain the objects, advantages and principles of the invention.

In the drawings,

FIG. 3 is a diagram showing symbols and code numbers of the respective symbols to be indicated in five-column display regions of the slot machine in common with the first and second embodiments;

FIG. 4A is a standard payout table showing relationship between payout-applied symbol combinations and payout amounts, which is applied to a base game of the slot machine directed to the first embodiment;

FIG. 4B is a payout-variable-game-use payout table showing relationship between payout-applied symbol combinations and payout amounts, which is applied to a payout-variable game of the slot machine directed to the first embodiment;

FIG. 4C is a standard payout table showing relationship between payout-applied symbol combinations and payout amounts, which is applied to a base game of the slot machine directed to the second embodiment;

FIG. 4D is a payout-variable-game-use payout table showing relationship between payout-applied symbol combinations and payout amounts, which is applied to a payout-variable game of the slot machine directed to the second embodiment;

DETAILED DESCRIPTION OF THE PREFERRED EMBODIMENTS

Figure 1:
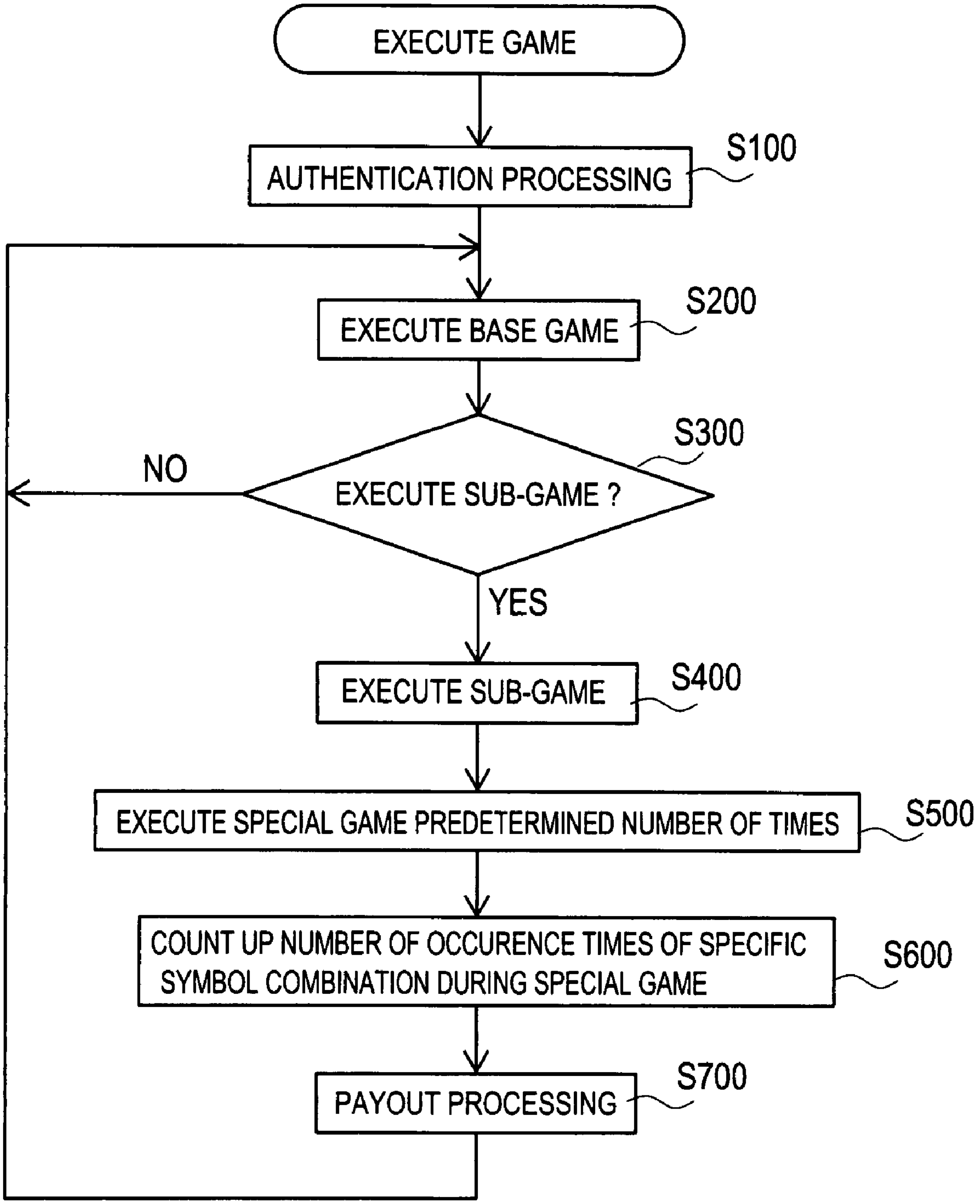
FIG. 1 is a flowchart schematically showing a playing method of a slot machine directed to the present invention.

FIG. 1 is a flowchart schematically showing a playing method of a slot machine according to the present invention. Schematic operations of the inventive slot machine and playing method thereof will be described by referring to a flowchart shown in FIG. 1 and a perspective view shown in FIG. 2.

When power is turned on and the slot machine is started up, an authentication processing is firstly executed (S100). At the authentication processing, an initial verification processing is executed prior to a start of a game (base game, second game, and the like), so as to verify whether or not programs for operating systems work normally, whether or not there is a programmatic falsification, and the like.

Next, a base game is executed (S200). A base game is executed by a trigger when a spin button 23 is pressed by a player on condition that a desired number of credits are bet by the player's inserting a coin into a coin insertion slot 21.

In a base game, there is firstly started spinning of symbols in each of display regions 28 (28_a_ through 28_e_) of a liquid crystal display 17 inside of 5-column×3-row display windows 15 (15_a_ through 15_e_) provided on a lower display panel 16 of a cabinet 11. After that, the spinning is terminated to stop and display (reposition) a symbol in each of the display regions 28 (28a through 28e).

The inventive slot machine executes a processing to determine a symbol to be stopped and displayed in each of the display regions 28 (28a through 28e) and at the same time, determines whether or not to execute a symbol combination selecting game (denoted as sub-game in FIG. 1) which is a game to select a specific symbol from among all the symbols that can be displayed in each of the display regions 28 (28a through 28e), that is, from among the symbols "JACKPOT7", "BLUE7", "BELL", "CHERRY", "STRAWBERRY", "PLUM", "ORANGE", "APPLE", LOBSTER", and "CRAB", a specific symbol for a specific symbol combination consisting of five identical symbols is selected (S 300).

In case it is determined to execute a symbol combination selecting game (S300: YES), a symbol combination selecting game is executed (S400).

Selection of a specific symbol combination in a symbol combination selecting game can executed by, for example, using the display of each of the symbols "JACKPOT7", "BLUE7", "BELL", "CHERRY", "STRAWBERRY", "PLUM", "ORANGE", "APPLE", "LOBSTER", and "CRAB" in each of symbol display regions 14a through 14j of a symbol-combination selecting display 14 which is provided below the display windows 15.

More specifically, when one of the symbol display regions 14a through 14j indicating different symbols respectively is selectively touched by the player to designate a desired symbol, an input signal in correspondence with the selected and touched one of the symbol display regions 14 is outputted from a touch panel 69 (see FIG. 5) which is provided on the front face of the lower display panel 16.

Consequently, it is possible for the inventive slot machine to recognize the selected specific symbol by treating the input signal from the touch panel 69 as external input and discriminating one of the symbol display regions 14a through 14j touched and operated. Thereby, a symbol combination consisting of five identical specific symbols can be recognized as selected specific symbol combination.

Furthermore, it is also possible to constitute the respective symbol display regions 14a through 14j of the symbol-combination selecting display 14 with equivalent number of push-button-type switches. In such mechanism, one of the push-button-type symbol display regions 14 pressed by the player can be identified by detecting an input signal from the pressed switch. In this case, an input signal from the pressed push-button-type switch corresponds to an external input.

When a symbol combination selecting game is executed, a payout variable game (denoted as special game in FIG. 1) is executed a predetermined number times in the inventive slot machine (S500).

In each payout variable game, spinning of symbols is started in the display regions 28 (28a through 28e) when the spin button 23 is pressed by the player as a trigger, and then, spinning of symbols is terminated to stop and display symbols in the display regions 28.

The inventive slot machine counts up the number of occurrence times of a specific symbol combination selected in a symbol combination selecting game during the payout variable game to be executed a predetermined number of times (S600).

As to the count of the number of occurrence times of the specific symbol combination during the payout variable game to be executed a predetermined number of times, the inventive slot machine counts up the following number of occurrence times or number of symbols in case a symbol combination consisting of five "PLUM" symbols is selected as specific symbol combination in a symbol combination selecting game, for example,.

That is, the inventive slot machine counts up the number of occurrence times of the specific symbol combination which consists of five "PLUM" symbols and is stopped and displayed in the display regions 28 with establishing an award accompanied by payout of credit as number of award accompanied occurrence times of the specific symbol combination during payout variable game to be executed a predetermined number of times (refer to a second embodiment to be described later).

Figure 18A:
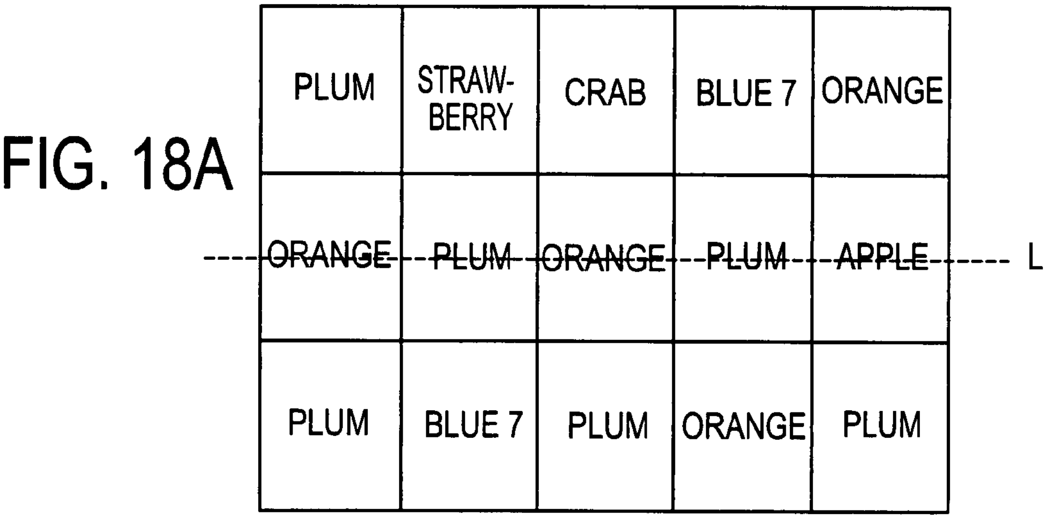
FIG. 18A is a diagram showing a display example when a symbol combination including a predetermined number or more of "PLUM" symbols is displayed.
Figure 18B:
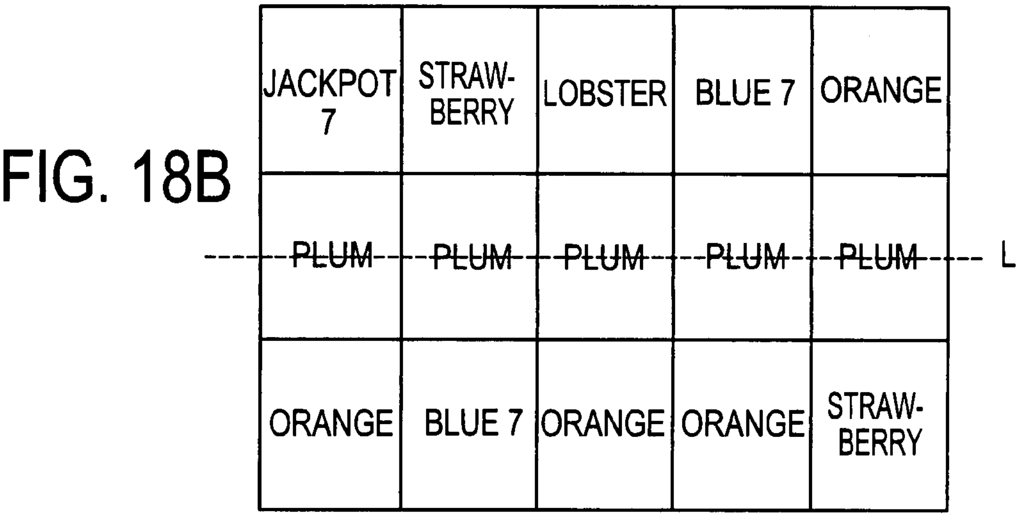
FIG. 18B is a diagram showing a display example when a winning symbol combination consisting of "PLUM" symbols is displayed on a pay line.

The specific symbol combination which consists of five "PLUM" symbols and establishes an award accompanied by payout of credit is such a symbol combination as shown in FIG. 18B. That is, it is a winning symbol combination which consists of five "PLUM" symbols and is stopped and displayed on the pay line L. In this regard, in case a solo symbol combination can be selected without an overlap, there may be added a combination consisting of predetermined number (e.g., six) or more of "PLUM" symbols as shown in FIG. 18A, for example, as specific symbol combination the player can select in a symbol combination selecting game.

That is, the pay line L horizontally running across each middle row of the five display windows 15 (15a through 15e) defines a symbol combination to be counted as the number of award accompanied occurrence times. Accordingly, a symbol combination to be counted into the number of award accompanied occurrence times is a symbol combination which consists of five identical specific symbols selected in a symbol combination selecting game and coincides with a symbol combination (a winning symbol combination) which establishes an award accompanied by payout of credit.

Figure 18C:
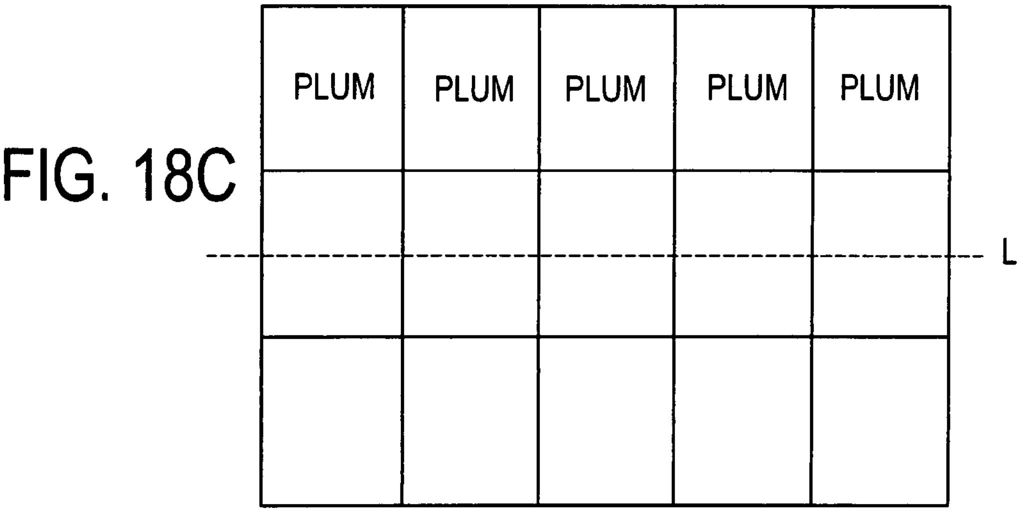
FIG. 18C is a diagram showing a display example when a symbol combination consisting of "PLUM" symbols is included in symbol combinations displayed in a symbol matrix.

Furthermore, in the inventive slot machine, a case as shown in FIG. 18C, for example, is counted into the number of award not accompanied occurrence times of the specific symbol combination during payout variable game to be executed a predetermined number of times. That is, it is the number of stopped-and-displayed times of the symbol combination which consists of five "PLUM" symbols selected in a symbol selecting game and is stopped and displayed in a row at the top row with reference to the display regions 28 in the five display windows 15. It is similarly applied to the symbol combination which consists of five "PLUM" symbols selected in a symbol selecting game and is stopped and displayed in a row at the bottom row with reference to the five display windows 15, it is also counted into the number award not accompanied occurrence times of the specific symbol combination (refer to a first embodiment to be described later).

That is, two imaginary lines horizontally running across the top and bottom rows of the five display windows 15 (15a through 15e) individually define a symbol combination to be counted as the number of award not accompanied occurrence times of the specific symbol combination occurrences. Accordingly, a symbol combination to be counted into the number of award not accompanied occurrence times is a symbol combination which consists of five identical specific symbols selected in a symbol combination selecting game and does not establish an award accompanied by payout of credit.

After the payout variable game has been executed a predetermined number of times, the inventive slot machine payouts credits in accordance with the number of award accompanied occurrence times or the number of award not accompanied occurrence times of the specific symbol combination counted during the payout variable game executed a predetermined number of times (S700). After that, the processing returns to S200 to execute a base game.

Accordingly, in the inventive slot machine, the number of credits to be paid out when a payout variable game terminates varies depending on the number of award not accompanied occurrence times of a specific symbol combination selected in a symbol combination selecting game or the number of award accompanied occurrence times of the specific symbol combination during the payout variable game executed a predetermined number of times.

Because of this, the inventive slot machine can further attract player's interest for the game by making the player expect that a number of credits to be paid out when the payout variable game terminates will increase depending on the number of award not accompanied occurrence times of a specific symbol combination selected in a symbol combination selecting game (restricted the one which does not establish an award accompanied by payout of credit) or the number of award accompanied occurrence times of the specific symbol combination.

There have been described examples of stopping and displaying symbols in the display regions 28 (28*a* through 28*e*) laid out in the 5-column×3-row display windows 15 (15*a* though 15*e*). However, the display format of the present invention is not restricted to the display regions 28 formed in a 5-column×3-row matrix.

Furthermore, there has been described a display example in which a symbol is displayed in each of the display regions 28 using the liquid crystal display 17. However, cylindrical-shaped mechanical reels with plural symbols on theirs peripheries are applicable. That is, after spinning of the mechanical reels is started, the spinning is stopped and symbols may be displayed inside of the respective display windows 15 (15*a* through 15*e*).

Furthermore, there has been described an example of spinning manner in which symbols are spun vertically with reference to each of the display regions 28 (28*a* through 28*e*) and sequentially, stopped and displayed (repositioned). However, symbols may be switched over (repositioned) in each of the display regions 28 (28*a* through 28*e*).

Next there will be described an outline construction of a slot machine 10 directed to the first embodiment by referring to a perspective view shown in FIG. 2. It is to be noted that this slot machine is installed in a gaming facility.

As to the slot machine 10 directed to the first embodiment, a coin, a bill, or electric redeemable value information corresponding to these are used as gaming media. However, in the present invention, the gaming media are not restricted to the above. For example, a medal, a token, an electric money, a ticket, and the like are applicable as gaming media. Regarding the above mentioned ticket, a bar-coded ticket to be described later, and the like are applicable.

Figure 2:
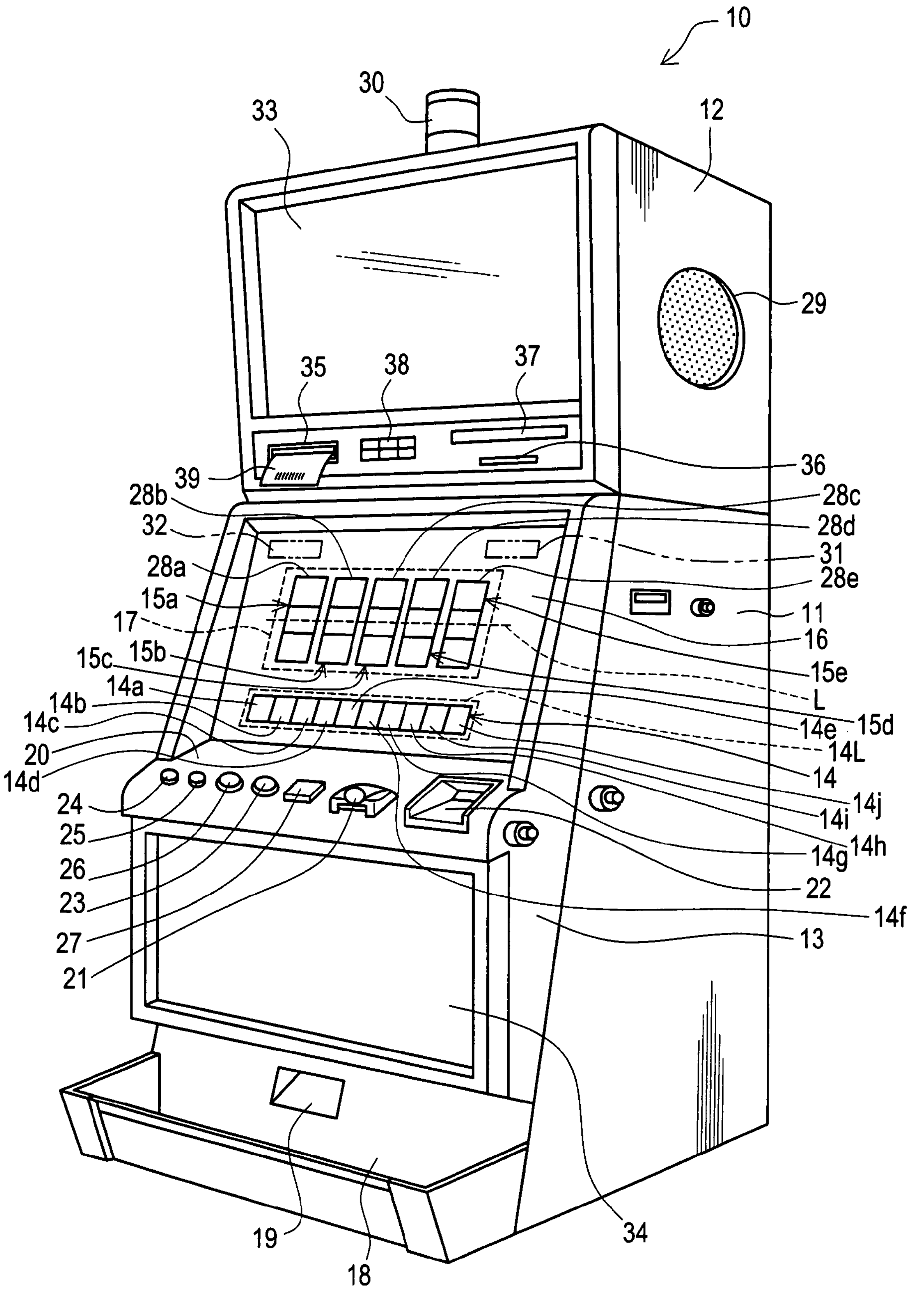
FIG. 2 is a perspective view showing an outline construction of the slot machines in common with a first embodiment and a second embodiment.

As shown in FIG. 2, the slot machine 10 comprises: a cabinet 11; a top box 12 arranged on the top side of the cabinet 11; and a main door 13 provided on the front face of the cabinet 11.

Inside of the cabinet 11, there is arranged a liquid crystal display 17 which displays symbols spinning in a 5-column×3-row matrix inside of display windows 15 (15*a* through 15*e*). The liquid crystal display 17 is equipped with display regions 28 (28*a* through 28*e*) for displaying symbols in the 5-column×3-row matrix. To be more specific, when a base game is started, symbols are spun in the 5-column×3-row matrix of the display regions 28 (28*a* through 28*e*), allowing the player to view and recognize symbols being spun through the display windows 15 (15*a* through 15*e*).

This embodiment employs liquid crystal display 17 equipped with the 5-column×3-row matrix of display regions 28 (28*a* through 28*e*) as an exemplary display. However, mechanical reels with symbols depicted on theirs peripheries are applicable. That is, symbols may be displayed through the display windows 15 by making the mechanical reels spin and subsequently stop. Furthermore, the matrix of the display regions 28 is not restricted to 5-column×3-row matrix.

A lower display panel 16 is provided in front of the liquid crystal display 17 on the main door 13. The lower display panel 16 is equipped with a transparent liquid crystal panel to display various information about game progress, animation effects and the like during a game.

In the lower display panel 16, a credit amount display section 31, and a payout amount display section 32 are provided. In the credit amount display section 31, the number of credited coins is indicated as image. In the payout amount display section 32, there are indicated the number of coins to be paid out when a symbol combination stopped and displayed on a pay line L to be described later coincides with a winning symbol combination, and the number of coins to be paid out when a combination including a predetermined number (e.g. six) or more of predetermined symbols is stopped and displayed in the display regions 28 (28*a* through 28*e*) as image.

At an inner side of the lower display panel 16, there are provided 5-column display windows 15 (15*a* through 15*e*) which allow visual recognition of symbols displayed in the 5-column display regions 28 (28*a* through 28*e*) of the liquid crystal display 17. Furthermore, there is provided a single pay line L horizontally running across the middle portion of the 5-column display windows 15 (15*a* through 15*e*). The pay line L defines a symbol combination, in other words, defines whether or not a symbol combination stopped and displayed thereon is a winning symbol combination. In case a symbol combination on the pay line L coincides with a winning symbol combination, coins are paid out depending on winning symbol combination and number of bets.

The number of coins to be paid out is converted to credits and added to the number of coins indicated in the credit amount display section 31. Indeed, it is also possible for the player to receive a payout of coins by pressing a CASHOUT button 25. Furthermore, a payout in a form of a bar-coded ticket 39 is also possible.

In this embodiment, there will described a case of a single pay line L. However, three pay lines horizontally running across top, middle and bottom portions with reference to the five display windows 15 (15*a* through 15*e*), or pay line running diagonally (v-shaped pay line, inverted v-shaped, and the like) may be formed, wherein and the pay lines in the number corresponding to the number of inserted coins are activated. In case a symbol combination stopped and displayed on an activated pay line coincides with a winning symbol combination accompanied by payout, coins in the number according to the wining symbol combination are paid out.

Furthermore, a symbol combination selecting display 14 is provided below the display regions 28 of the lower display panel 16.

The symbol combination selecting display 14 has plural symbol display regions 14 (14*a* through 14*j*) to individually display all the symbols that can be displayed in the display regions 28 (28*a* through 28*e*) with the liquid crystal display 17, namely, "JACKPOT7", "BLUE7", "BELL", "CHERRY", "STRAWBERRY", "PLUM", "ORANGE", "APPLE", LOBSTER", and "CRAB".

It is to be noted that each of the symbol display regions 14*a* through 14*j* can be lit up and displayed individually by a backlight 14L (see FIG. 5) provided therebehind.

Furthermore, a touch panel 69 (see FIG. 5) is provided on the front face of the lower display panel 16, whereby the player can input various instructions with the touch panel 69.

Furthermore, below the lower display panel 16, there are provided: a control panel 20 which consists of plural buttons 23 through 27 with which instructions concerning game progress are inputted by the player; a coin insertion slot 21 for accepting coins in the cabinet 11; and a bill validator 22.

The control panel 20 includes: a spin button 23; a change button 24; a CASHOUT button 25; a 1-BET button 26; and a MAX-BET button 27. The spin button 23 is a button to input an instruction to start spinning of symbols displayed in the display regions 28. The change button 24 is a button to ask a staff of the gaming facility of money changing. The CASHOUT button 25 is a button to input an instruction to pay out credited coins onto a coin tray 18 through a coin payout hole 19.

The 1-BET button 26 is a button to input an instruction to bet a single coin upon a game among the credited coins the player currently holds. The MAX-BET button 27 is a button to input an instruction to bet maximum number of coins (fifty coins in the first embodiment) allowed to be bet upon a single game among the credited coins the player currently holds.

The bill validator 22 discriminates counterfeit bills and accept legitimate bills in the cabinet 11. Incidentally, the bill validator 22 may be designed so as to be able to read a bar-coded ticket 39 to be described later. On a lower front face of the main door 13, i.e., lower portion of the control panel 20, there is provided a glass panel 34 on which character (s) of the slot machine 1 or the like is depicted.

An upper display panel 33 is provided on the front face of the top box 12. The upper display panel 33 is equipped with a crystal liquid panel in which animation effects, introduction of the game contents, explanation of game rules, and the like are displayed.

A speaker 29 for audio output and a lamp 30 for notifying errors or the like are provided on the top box 12. Below the upper display panel 33, a ticket printer 35, a card reader 36, a data display 37 and a key pad 38 are provided. The ticket printer 35 is a printing device for printing bar codes on a ticket in which data concerning the number of credits, date/time, the identification number of the slot machine 10, and the like are encoded, and outputting the ticket as bar-coded ticket 39. The player can play games on other slot machines using a bar-coded ticket 39 or exchange the bar-coded ticket 39 with bills or the like at a cashier in the gaming facility or the like.

The card reader 36 is to read data from a smart card and, vice versa, to write data in a smart card. A smart card is a card carried by the player, and for example, data to identify the player, data concerning gaming history of the player, and the like are recorded thereon.

The data display 37 is made of fluorescent display or the like and displays data read by the card reader 36 and data inputted by the player with the key pad 38. The key pad 38 is to input instructions and data concerning issuance of ticket and the like.

FIG. 3 indicates symbol columns to be spun in the display regions 28 (28*a*through 28*e*) provided in the liquid crystal display 17 installed inside the cabinet 11. As shown in FIG. 3, columns of a total of twenty-two symbols associated with code numbers "00" through "21, respectively, are spun in each of the display regions 28 (28*a* through 28*e*). The columns of symbols are different for each of the display regions 28 (28*a* through 28*e*).

Symbols to be displayed in each of the display regions 28 (28*a* through 28*e*) are composed by combining the symbols "JACKPOT7", "BLUE7", "BELL", "CHERRY", "STRAWBERRY", "PLUM", "ORANGE", "APPLE", LOBSTER", and "CRAB". Combinations of theses symbols set symbol combinations accompanied by payout.

Symbol combinations accompanied by payout include symbol combinations which coincide with winning symbol combinations each of which consists of five identical symbols stopped and displayed on the pay line L of the display windows 15 and combinations each of which includes predetermined number (e.g., six) or more of "BELL" symbols.

Furthermore, in a payout variable game to be described later, combinations each of which includes predetermined number (e.g., six) or more of identical specific symbols selected by the player are added to the above-mentioned symbol combinations accompanied by payout.

In the slot machine 10, there is set a payout tables to determine payout amount (payout rate) when a symbol combination accompanied by payout is won.

FIG. 4A shows a standard payout table. This standard payout table is selected when a base game is executed alone. While a payout variable game which serves both as base game is executed, there may possibly be selected a payout-variable-game-use payout table to be described later.

As shown in FIG. 4A, in case a symbol combination consisting of five "APPLE" symbols is stopped and displayed on the pay line L provided on the five display regions 28 (28*a* through 28*e*), a bonus game trigger is invoked. As a result, game mode shifts from a base game state to a bonus game state and twenty-five coins are paid out. Winning possibility of this symbol combination is 0.5 percent.

Furthermore, in case a symbol combination consisting of five "LOBSTER" symbols is stopped and displayed on the pay line L, twenty-five coins are paid out. In case a symbol combination consisting of five "BELL" symbols is stopped and displayed on the pay line L, twenty-five coins are paid out. Winning possibility of these symbol combinations is 0.8 percent.

Furthermore, in case a symbol combination consisting of five "CHERRY" symbols is stopped and displayed on the pay line L, twenty coins are paid out. In case a symbol combination consisting of five "BLUE7" symbols is stopped and displayed on the pay line L, twenty coins are paid out. Winning possibility of these symbol combinations is 1.1 percent.

Furthermore, in case a symbol combination consisting of five "STRAWBERRY" symbols is stopped and displayed on the pay line L, ten coins are paid out. In case a symbol combination consisting of five "ORANGE" symbols is stopped and displayed on the pay line L, ten coins are paid out. Winning possibility of these symbol combinations is 1.5 percent.

Furthermore, in case a symbol combination consisting of five "CRAB" symbols is stopped and displayed on the pay line L, five coins are paid out. In case a symbol combination consisting of five "PLUM" symbols is stopped and displayed on the pay line L, five coins are paid out. Winning possibility of these symbol combinations is 3.0 percent.

Furthermore, in case a symbol combination consisting of five "JACKPOT7" symbols is stopped and displayed on the pay line L, twenty-five coins are paid out and a jackpot is given. Winning possibility of this symbol combination is 0.1 percent.

Furthermore, in case six "BELL" symbols are stopped and displayed in the five display regions 28 (28*a* through 28*e*), three coins are paid out. Winning possibility of this symbol combination is 7.5 percent.

Winning possibility associated with each of the symbol combinations indicated in FIG. 4A is applied in case payout rate under execution of base game is set to a predetermined value. Furthermore, the winning possibility indicated in FIG. 4A corresponds to possibility to form each of the indicated symbol combinations when certain symbol weight data is applied and code numbers of respective symbol columns directed to the respective display regions 28 (28*a* through 28*e*) are determined in accordance with five random number values. That is, a random number value is not associated with each of the symbol combinations.

A bonus game which occurs when five "APPLE" symbols are stopped and displayed on the pay line L is more advantageous than a base game. In this embodiment, a bonus game corresponds to a free game (a game that can be played a predetermined number of times without betting coins). In the present invention, the manner of a bonus game is not particularly restricted as long as it provides the player with an advantageous game state. Furthermore, as long as more advantageous than a base game for the player in any ways, a bonus game is not restricted to a particular one. There may be a variety of more advantageous states such as a state in which more gaming media can be obtained in comparison with a base game, a state in which gaming media can be obtained with higher winning possibility in comparison with a base game, a state in which less gaming media are consumed in comparison with a base game, and the like. Specifically, a free game, a second game and the like can be raised as example of a bonus game.

After either the 1-BET button 26 or the MAX-BET button 27 is pressed and sequentially the spin button 23 is pressed, spinning of symbols that have been displayed (positioned) in the display regions 28 is started. When spinning of symbols is started, the spinning of symbols is stopped (repositioning of symbols is taken) after a lapse of a predetermined time. At this moment, any symbols of the column of symbols columns on each of the display regions 28 (28*a* through 28*e*) shown in FIG. 3 are stopped and displayed in the display regions 28 (28*a* through 28*e*) provided inside of the display windows 15 (15*a* through 15*e*).

Furthermore, various winning combinations (see FIG. 4A) have previously been defined with reference to each symbol. When a winning symbol combination is stopped and displayed on the pay line L, a certain number of coins according to the winning symbol combination are added to the credits the player currently holds. Furthermore, when a bonus game trigger is invoked, i.e., when five "APPLE" symbols are stopped and displayed on the pay line L in this embodiment, game mode shifts from a base game state to a bonus game state.

FIG. 4B shows a payout-variable-game-use payout table. This payout-variable-game-use payout table may be possibly selected when a payout variable game which serves both as base game is being executed. However, the table is not selected when a base game alone is being executed.

In the payout-variable-game-use payout table shown in FIG. 4B, each payout rate to be applied to each symbol combination consisting of five identical specific symbols selected by the player for commencing the payout variable game is multiplied by a count value M to be described later. In this regard, the payout-variable-game-use payout table of FIG. 4B is different from the standard payout table of FIG. 4A which is selected when a base game alone is being executed.

In this regard, the smaller is an increase rate determined by a multiple of the count value M to be described later which is applied to a symbol combination consisting of five identical specific symbols in accordance with the payout-variable-game-use payout table 4B, the larger is the counterpart payout rate (initial value) according to the standard payout table of FIG. 4A.

Furthermore, the contents of the payout-variable-game-use payout table shown in FIG. 4B are those in which a guaranteed minimum payout number of (two) coins to be paid out when no payout is made during the payout variable game for a symbol combination consisting of five identical specific symbols selected by the player in the display regions 28 is added to the standard payout table of FIG. 4A.

In case of changing payout rates of respective symbol combinations each of which consists of five identical specific symbols selected by the player with regard to the payout-variable-game-use payout table of FIG. 4B, the number of coins to be paid out can be made to increase in irrelevant to an integral multiple of a payout rate (initial value) according to the standard payout table of FIG. 4A as long as it is satisfied that the larger is a payout rate (initial value) according to the standard payout table of FIG. 4A, the smaller is an increase rate determined by a multiple of the count value M to be described later.

Figure 5:
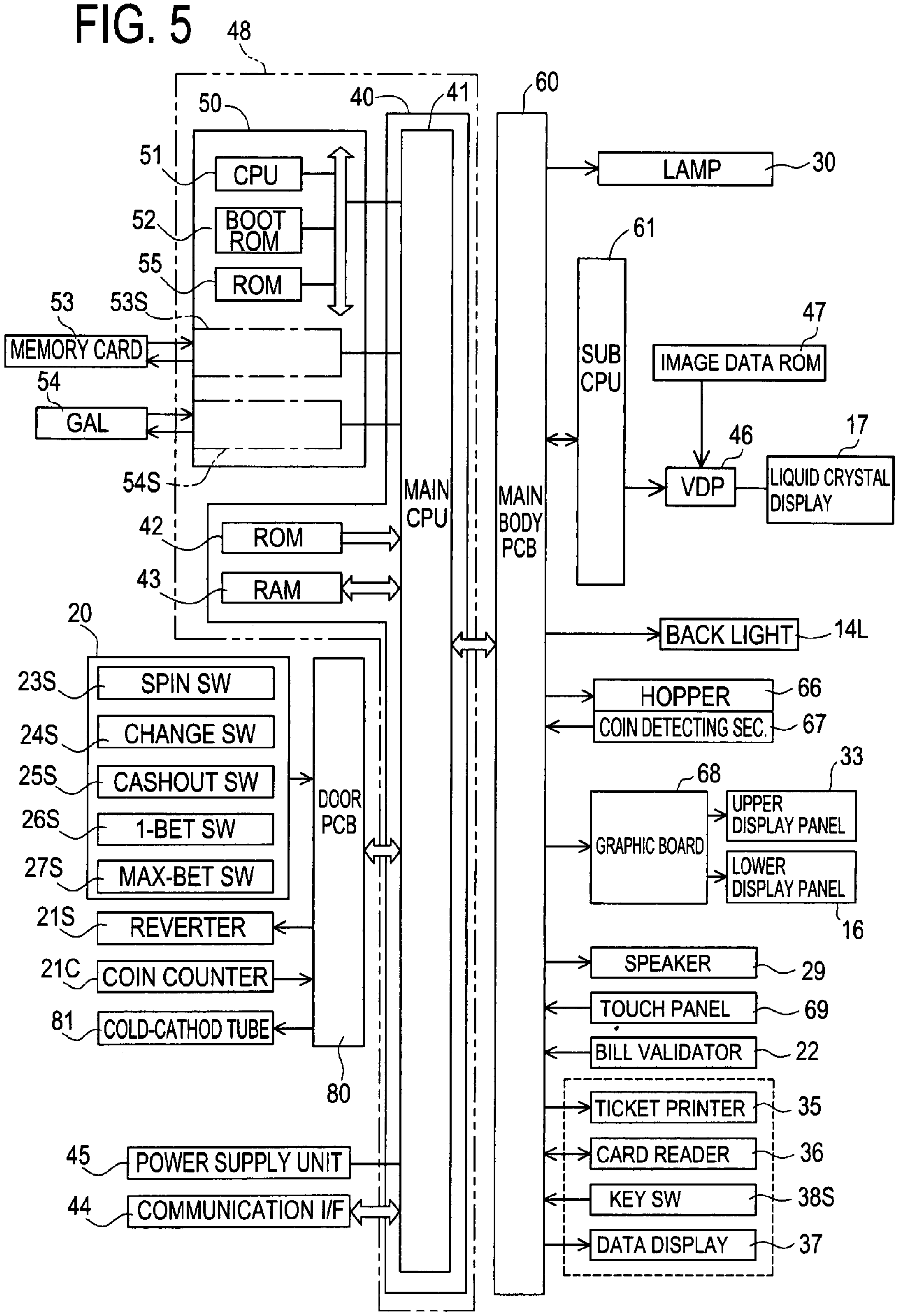
FIG. 5 is a block diagram showing a control circuit of the slot machine in common with the first and second embodiments.

FIG. 5 is a block diagram schematically showing a control circuit of the slot machine 10 shown in FIG. 2. As shown in FIG. 5, the control circuit consists of a mother board 40, a main body PCB (Printed Circuit Board) 60, a gaming board 50, a sub CPU 61, a door PCB 80, various switches and sensors, and the like. A controller 48 is constituted by the mother board 40 and the gaming board 50.

The gaming board 50 consists of: a CPU (Central Processing Unit) 51, a ROM 55, and a boot ROM 52, connected to one another by an internal bus; a card slot 53S for corresponding to a memory card 53; and an IC socket 54S corresponding to a GAL (Generic Array Logic) 54.

The memory card 53 stores game programs and game system programs. The game programs include a to-be-stopped-symbols determination program. The to-be-stopped-symbols determination program is to determine symbols (i.e., code numbers associated with respective symbols) to be stopped and displayed on the pay line L provided on the display regions 28 (28*a* through 28*e*). The to-be-stopped-symbols determination program also includes symbol weight data associated with plural kinds of payout rates (e.g., 80%, 84%, and 88%). The symbol weight data are to associate each of the five display regions 28 (28*a* through 28*e*) with one code number (see FIG. 3) and one or plural random number value(s) within a predetermined numerical value range (0~255).

The payout rate is determined in accordance with payout rate setting data outputted from the GAL 54 and symbols to be stopped and displayed are determined in accordance with the symbol weight data associated with to the payout rate.

The card slot 53S is structured such that a memory card 53 can be inserted in and removed from there, and connected to the mother board 40 with the IDE bus. Therefore, the type or contents of the game to be executed with the slot machine 10 can be changed by removing the memory card 53 from the card slot 53S, writing another game program and game system program in the memory card 53 and inserting the memory card 53 in the card slot 53S.

The game programs include a program relating to game progress, a program for shifting to a bonus game state, and the like. The game programs include image data and sound data to be outputted during the game.

The GAL 54 is equipped with plural input ports and output ports and when certain data is inputted to an input port, data associated with the inputted data is outputted from an output port. The data outputted from the output port is the aforementioned payout rate setting data.

The IC socket 54S is structured such that the GAL 54 can be attached to and detached from there, and is connected to the mother board 40 with the PCI bus. Therefore, the payout rate setting data to be outputted from the GAL 54 can be changed by detaching a GAL 54 from the IC socket 54S, rewriting the program to be stored in the detached GAL 54 and re-attaching the GAL 54 to the IC socket 54S.

The CPU 51, the ROM 55 and the boot ROM 52 connected to one another with an internal bus are connected to the mother board 40 with the PCI bus. The PCI bus transmits signals between the mother board 40 and the gaming board 50 and supplies power from the mother board 40 to the gaming board 50. The ROM 55 stores country identification information and an authentication program. The boot ROM 52 stores an auxiliary authentication program, a program (boot code) by which the CPU 51 starts the auxiliary authentication program, and the like.

The authentication program is a program (falsification-check program) for authenticating the game programs and game system programs. The authentication program is to check and prove that the game programs and game system programs have not been falsified. That is, the authentication program is written in accordance with authentication procedures of the game programs and game system programs. The auxiliary authentication program is to authenticate the above-mentioned authentication program. That is, the auxiliary authentication program is to prove that the authentication program subject to an authentication processing is not falsified. That is, the auxiliary authentication program is written in accordance with authentication procedures of the authentication program.

Next, there will be described the mother board 40. The mother board 40 is equipped with a main CPU 41, a ROM (Read Only Memory) 42, a RAM (Random Access Memory) 43, and a communication interface 44.

The main CPU 41 works as a controller for controlling the entirety of the slot machine 10. Especially, when credits have been bet upon and the spin button 23 is pressed by the player, the main CPU 41 executes a series of control operations to cause the sub CPU 61 to output an instruction signal so that spinning of symbols should be executed in the display regions 28 (28*a* through 28*e*) of the liquid crystal display 17, to determine symbols to be stopped and displayed on the middle portion (on the pay line L) with reference to the display regions 28 (28*a* through 28*e*) after spinning of symbols is started; and to stop and display the determined symbol on the pay line L.

That is, the CPU 41 controls the arrangement in such a manner of: firstly putting plural symbols to be displayed in a display (liquid crystal display 17) in a spinning state; selecting and determining a symbol arrangement from among a plurality of types of symbols so as to reposition into a new symbol matrix; and stopping the spinning state and displaying symbols in accordance with the determined symbol arrangement.

Furthermore, the main CPU 41 also controls to cause payout to occur when symbols repositioned in the display regions 28 (28*a* through 28*e*) of the liquid display 17 form a payout-applied symbol combination.

Furthermore, in order to cause the player to select a specific symbol (or a specific symbol combination) by the contact operation of each of the symbol display regions 14*a* through 14*j* in the symbol-combination selecting display 14, the main CPU 41 controls a back light 14L, which is capable of turning on and off separately for each part corresponding to each of the symbol display regions 14*a* through 14*j*, to turn on all together temporarily at the time of commencing the payout variable game.

Still further, in order to display the specific symbol (the specific symbol combination) selected by the player, for example, the main CPU 41 controls the back light 14L to turn off with respect to portions corresponding to the symbol display regions 14*a* through 14*e* and 14*g* though 14*j* while keeping lit the part of the back light 14L corresponding to the symbol display region 14*f* of the "PLUM" symbol, one of the symbol display regions touched and operated by the player.

The ROM 42 stores such programs as BIOS (Basic Input/Output System) to be executed by the main CPU 41 and the like as well data to be used permanently. When the BIOS is executed by the main CPU 41, an initialization processing for peripheral unit is executed and a read processing for reading the game programs and game system programs stored in the memory card 53 through the gaming board 50 is started.

The RAM 43 stores data and programs to be used when the main CPU 41 executes the processing.

The communication interface 44 is a communicating device for communicating with the host computer and the like installed in a gaming facility through a communication line.

Furthermore, the main body PCB (Printed Circuit Board) 60 and the door PCB 80 both described later are connected to the mother board 40 separately with a USB (Universal Serial Bus). Furthermore, a power supply unit 45 is connected to the mother board 40. When electric power is supplied to the mother board 40 from the power supply unit 45, the main CPU 41 in the mother board 40 is activated and at the same time, electric power is supplied to the gaming board 50 through a PCI bus, and the CPU 51 is activated.

Devices for generating input signals to be fed to the main CPU 41 and devices of which operations are controlled by control signals outputted from the main CPU 41 are connected to the main body PCB 60 and the door PCB 80. The main CPU 41 executes arithmetic processing and stores their result in the RAM 43, or transmits control signals to respective devices and units as control processing for the respective devices and units by executing the game programs and game system programs stored in the RAM 43 in accordance with input signals fed to the main CPU 41.

To the main body PCB 60, a lamp 30, a sub CPU 61, a hopper 66, a coin detecting section 67, a graphic board 68, a speaker 29, a touch panel 69, a bill validator 22, a ticket printer 35, a card reader 36, a key switch 38S, a data display 37, and a back light 14L are connected.

In case an error occurs to the slot machine 10 and the player needs to talk to a staff of the gaming facility, the lamp 30 flashes in a predetermined to manner.

The sub CPU 61 controls spinning display of symbols in the five-column display regions 28 (28*a* through 28*e*) provided on the liquid crystal display 17 and it is connected to a VDP (Video Display Processor) 46. The VDP 46 reads out image data of symbols stored in an image data ROM 47, generates a spinning image to be displayed in the liquid crystal display 17, and outputs the spinning image to the liquid crystal display 17.

The hopper 66 is provided inside of the cabinet 11 and pays out predetermined number of coins from the coin payout hole 19 (see FIG. 2) onto the coin tray 18 (see FIG. 2) in accordance with a control signal outputted from the main CPU 41. The coin detecting section 67 is provided inside of the coin payout hole 19 and outputs an input signal to the main CPU 41 when detecting a payout of a predetermined number of coins from the coin payout hole 19.

The graphic board 68 controls the display of symbols to be displayed in the display regions 28 and each symbol in each of the symbol display regions 14*a* through 14*j* of the symbol selecting display 14, and the display of other images except the turning on and off of each part corresponding to each of the symbol display regions 14*a* thorough 14*j* of the back light 14 L in the upper display panel 33 and the lower display panel 16, in accordance with signals outputted from the main CPU 41.

The credit amount display section 31 provided in the lower display panel 16 displays the number of credits recorded in the RAM 43. Furthermore, the payout amount display section 32 in the lower display panel 16 displays the number of coins to be paid out. Furthermore, the graphic board 68 is equipped with a VDP for generating image data in accordance with a control signal outputted from the main CPU 41, a video RAM for temporarily storing the image data generated by the VDP, and the like.

The bill validator 22 reads an image of a bill and accepts a legitimate bill into the cabinet 11. Upon accepting a legitimate bill, the bill validator 22 outputs an input signal to the main CPU 41 in accordance with the value of the bill. The main CPU 41 records, in the RAM 43, the number of credits equivalent to the value of the bill transmitted with the input signal.

The ticket printer 35 prints bar codes on the ticket expressing coded data such as the number of credits recorded in the RAM 43, date and time, an identification number of the slot machine 10, and the like in accordance with control signals outputted from the main CPU 41, and outputs the ticket as the bar-coded ticket 39 (see FIG. 2).

The card reader 36 reads data from the smart card to sends the data to the main CPU 41 or writes data into the smart card in accordance with control signals from the main CPU 41. The key switch 38S is provided on the key pad 38 (see FIG. 2) and outputs a certain input signal to the main CPU 41 when the key pad 38 is operated by the player.

The data display 37 displays data read out by the card reader 36 and data inputted by the player through the key pad 38 in accordance with a control signal outputted from the main CPU 41.

A control panel 20, a reverter 21S, a coin counter 21C and a cold-cathode tube 81 are connected to the door PCB 80. The control panel 20 is equipped with a spin switch 23S directed to the spin button 23 (see FIG. 2), a change switch 24S directed to the change button 24 (see FIG. 2), a CASHOUT switch 25S directed to the CASHOUT button 25 (see FIG. 2), a 1-BET switch 26S directed to the 1-BET button 26 (see FIG. 2), and a MAX-BET switch 27S directed to the MAX-BET button 27 (see FIG. 2). The respective switches 23S through 27S output input signals to the main CPU 41 when their corresponding buttons 23 through 27 are operated by the player.

The coin counter 21C is provided inside of the coin insertion slot 21 (see FIG. 2) and discriminates whether or not a coin inserted in the coin insertion slot 21 by the player is legitimate. Coins other than legitimate ones are ejected from the coin payout hole 19 (see FIG. 2). Furthermore, the coin counter 21C outputs an input signal to the main CPU 41 upon detecting a legitimate coin.

The reverter 21S operates in accordance with a control signal outputted from the main CPU 41 and distributes coins discriminated as legitimate ones by the coin counter 21C to either a cash box (not shown) or the hopper 66 installed inside of the slot machine 10. That is, in case the hopper 66 is filled with coins, legitimate coins are sent to the cash box. On the other hand, in case the hopper 66 is not filled with coins, legitimate coins will be sent to the hopper 66.

The cold-cathode tube 81 works as back light arranged on rear side of the lower display panel 16 and that of the upper display panel 33 and flashes in accordance with a control signal outputted from the main CPU 41.

Figure 6:
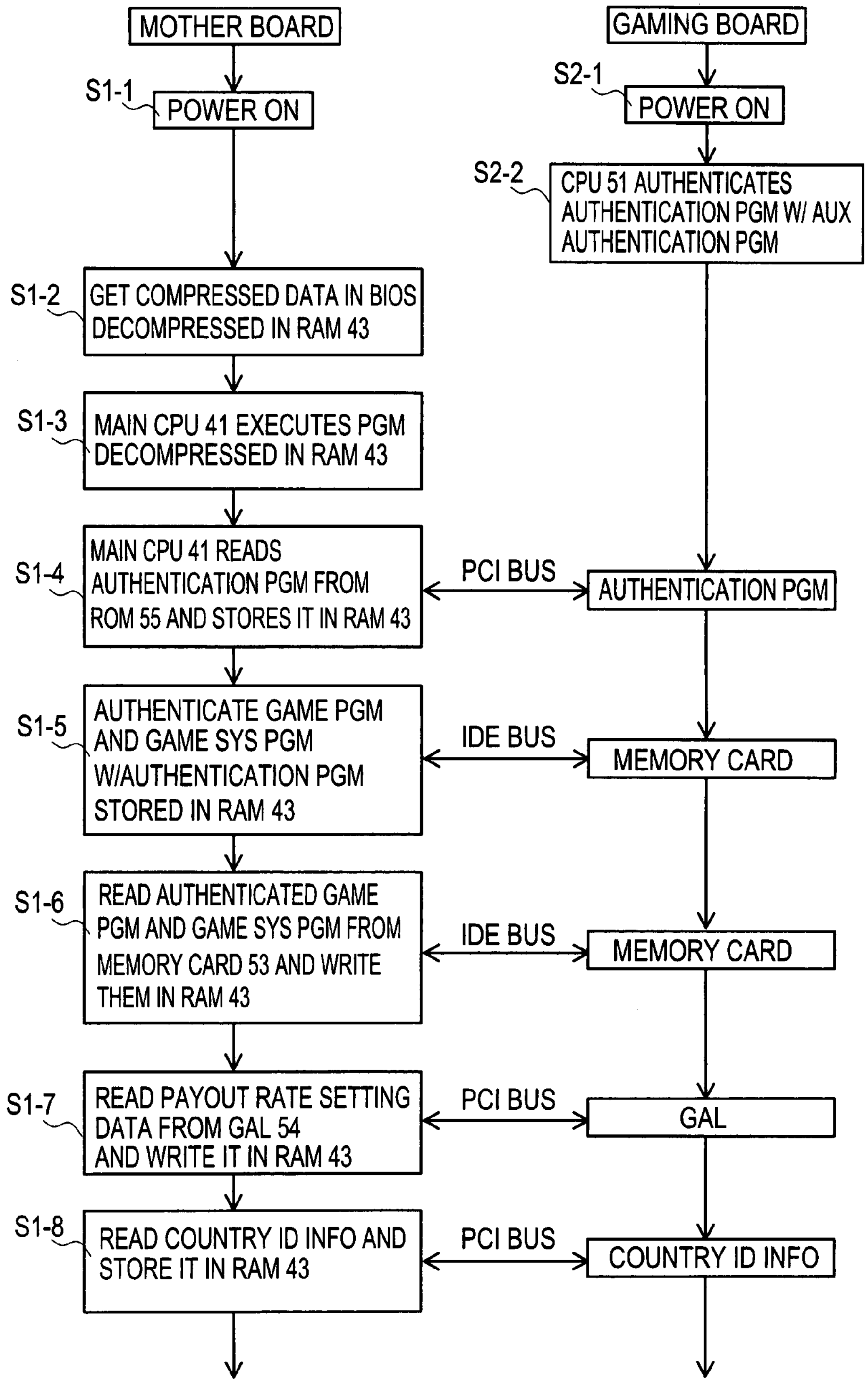
FIG. 6 is a flowchart regarding procedures of authentication readout processing of a game program and a game system program executed by a mother board and a gaming board of the slot machine in common with the first and second embodiments.

Next, there will be described a specific series of processing to be executed by the slot machine 10. FIG. 6 is a flowchart showing procedures of the authentication readout processing (processing at S100 in FIG. 1) for the game programs and the game system programs to be authenticated by the mother board 40 and the gaming board 50 shown in FIG. 5. It is to be noted that the authentication readout processing can be executed on condition that a memory card 53 has been inserted in the card slot 53S on the gaming board 50 and the GAL 54 has been attached to the IC socket 54S.

When the power switch is turned on in the power supply unit 45, the mother board 40 and the gaming board 50 are activated (S 1-1 and S2-1). Upon activation of the mother board 40 and the gaming board 50, procedures at the mother board 40 and procedures at the gaming board 50 are executed individually in parallel. That is, in the gaming board 50, the CPU 51 reads out the auxiliary authentication program stored in the boot ROM 52 and executes the auxiliary authentication in accordance with the read-out auxiliary authentication program to check and prove that the authentication program has not been falsified, before being taken into the mother board 40 (S2-2).

In the mother board 40, the main CPU 41 executes the BIOS stored in the ROM 42 and gets compressed data in the BIOS decompressed into the RAM 43 (S1-2). Then, the main CPU 41 executes the BIOS decompressed into the RAM 43 and executes diagnosis and initialization of various peripheral devices (S1-3).

Thereupon, since the ROM 55 of the gaming board 50 is connected to the main CPU 41 via the PCI bus, the main CPU 41 reads out the authentication program stored in the ROM 55 and further executes processing to store the read-out authentication program in the RAM 43 (S1-4).

Next, the main CPU 41 gets access to the memory card 53 inserted in the card slot 53S via the IDE bus and reads out the game programs and the game system programs from the memory card 53.

Next, the main CPU 41 executes authentication to check and prove that the read-out game programs and the game system programs have not been falsified in accordance with the authentication program stored in the RAM 43 (S1-5).

In case the authentication processing is completed normally, the main CPU 41 stores the authenticated game programs and game system programs in the RAM 43 (S1-6). Next, the main CPU 41 gets access to the GAL 54 attached to the IC socket 54S via the PCI bus, reads out payout rate setting data from the GAL 54, and stores the data in the RAM 43 (S1-7). Next, the main CPU 41 reads country identification information stored in the ROM 55 of the gaming board 50 via the PCI bus and stores the read-out country identification information in the RAM 43 (S1-8).

After executing the above-mentioned series of processing, the main CPU 41 sequentially reads and executes the game programs and the game system programs one by one, whereby a base game is progressed as described below.

Figure 7:
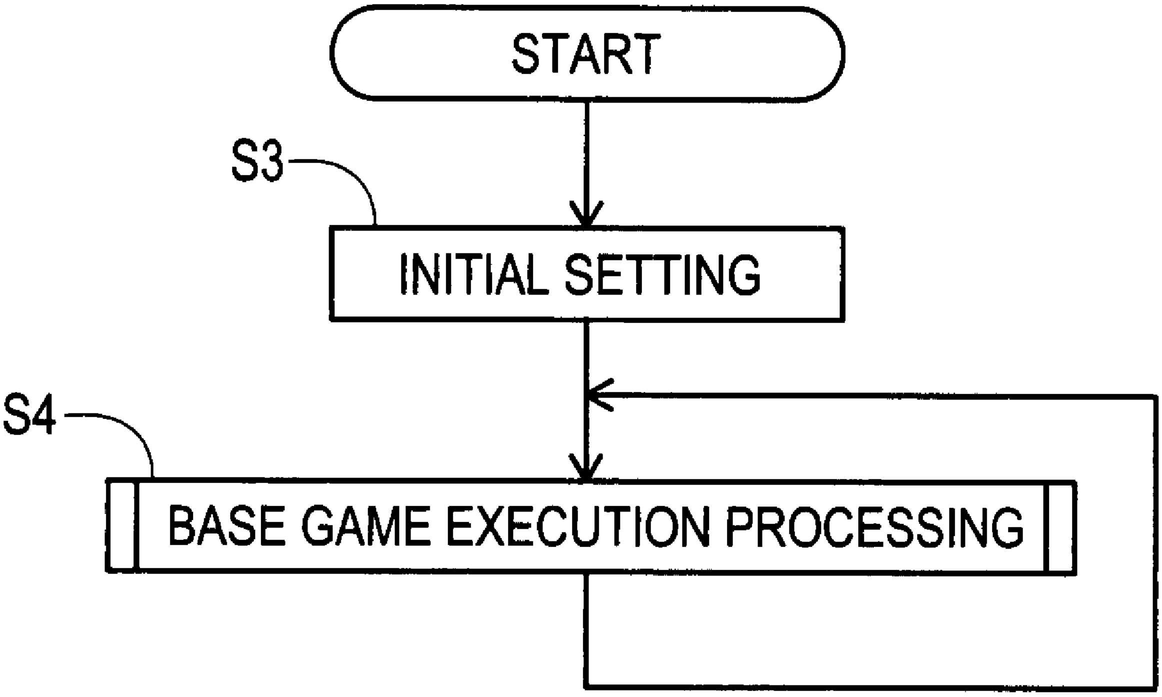
FIG. 7 is a flowchart showing a part of procedures executed by the slot machine in common with the first and second embodiments.

Firstly, after the authentication readout processing of FIG. 6 has been executed, the main CPU 41 executes an initial setting (S3) and sequentially executes a base game execution processing, as shown in a flowchart of FIG. 7, (S4).

In the initial setting, the main CPU 41 sets a flag F of the RAM 43 to “0” for indicating whether or not the payout variable game is being executed. At the same time, the main CPU 41 resets the following two count values to "0", namely: a count value M of a specific-symbol-combination occurrence counter in the RAM 43, the count value M indicating the number of occurrences of a specific symbol combination selected by the player during the payout variable game; and a count value N of an execution-times counter of the RAM 43, the count value N indicating the number of times payout variable game(s) is/are executed.

Figure 8:
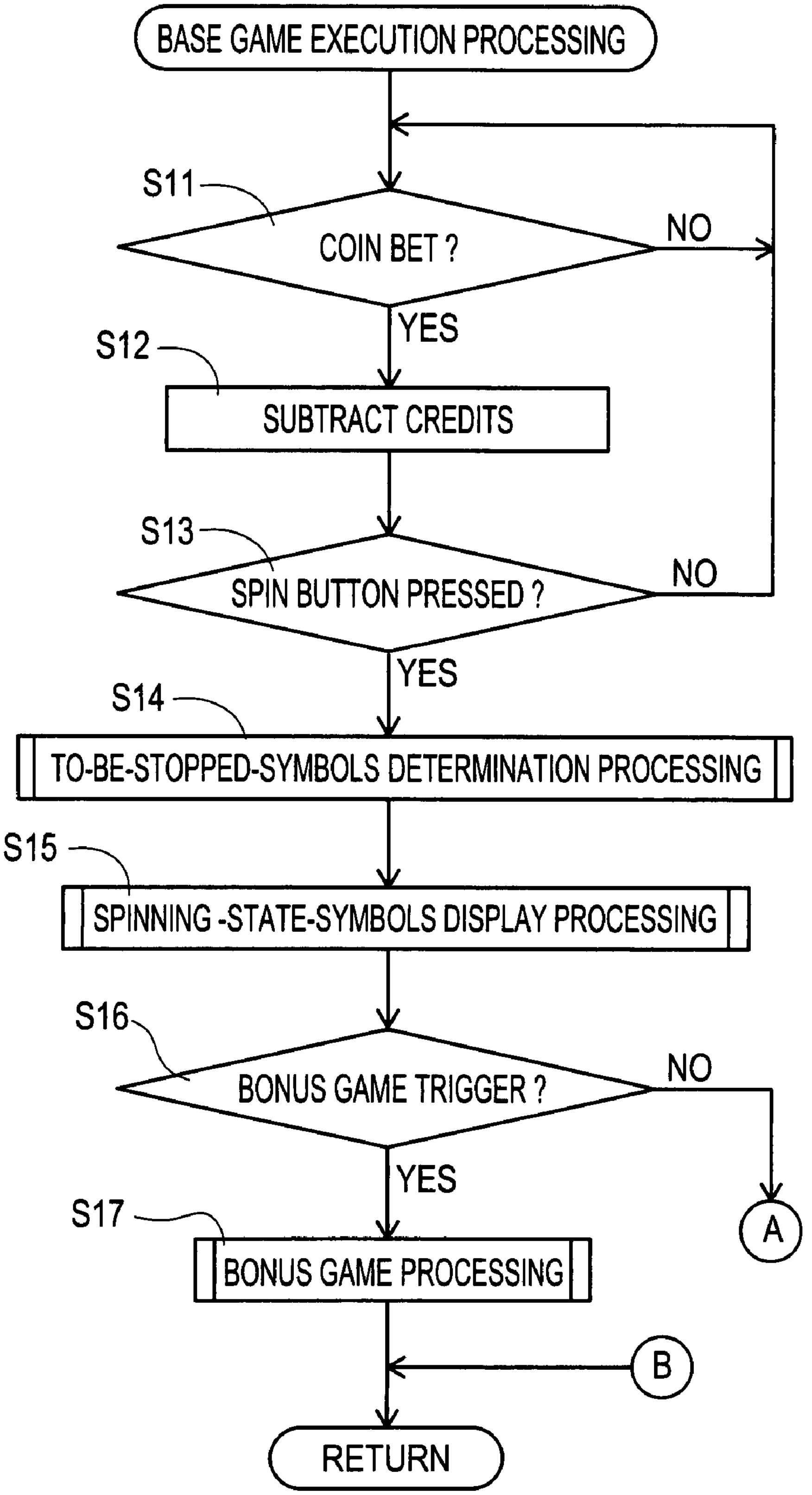
FIG. 8 is a flowchart showing a part of base game procedures executed by the slot machine directed to the first embodiment.

FIG. 8 shows definite processing procedures of the base game execution processing directed to S200 of FIG. 1 and S4 of FIG. 7.

In the base game execution processing, the main CPU 41 judges whether or not a coin has been bet (S11). At this processing, the main CPU 41 judges whether or not an input signal that is outputted from the 1-BET switch 26S in response to the player's pressing the 1-BET button 26 or an input signal outputted from the MAX-BET switch 27S in response to the player's pressing the MAX-BET button 27 is received. In case it is judged that no coin is bet by the player, the processing returns to S11.

In case it is judged that coins has been bet by the player at S11, the main CPU 41 executes a processing to subtract the number of credits recorded in the RAM 43 is reduced depending on the number of coins bet (S12). In case the number of coins bet is larger than the number of credits recorded in the RAM 43, the processing returns to S11 without subtracting the number of credits stored in the RAM 43. Furthermore, in case the number of coins bet is exceeds an upper limit (fifty coins in the first embodiment) that can be bet for a single game, the processing goes on to S13 without subtracting the number of credits stored in the RAM 43. At this stage of entering into S13, spinning symbols can be displayed in the display regions 28 (28*a* through 28*e*).

Next, the main CPU 41 judges whether or not the spin button 23 is pressed by the player (S13). At this processing, when the spin button 23 is pressed by the player, the main CPU 41 judges whether or not to an input signal that is outputted from the spin switch 23S is received.

In case it is judged that the spin button 23 has not been pressed by the player, the processing returns to S11. In case the spin button 23 is not pressed by the player (e.g., in case an instruction to terminate the game has been inputted by the player without the spin button pressed), the main CPU 41 cancels the subtraction result obtained at S12.

In this embodiment, there will be described a case that the processing of subtracting the number of credits (S12) is executed after coins have been bet by the player (S11) and before judgment whether or not the spin button 23 has been pressed by the player (S13). However, the present invention is not restricted to this case. For example, the processing of subtracting the number of credits (S12) may be executed in case the judgment whether or the spin button 23 is pressed by the player (S13) is made after coins have been bet by the player (S11) and it is judged that the spin button 23 has been pressed by the player (S13: YES).

In case it is judged that the pin button 23 has been pressed by the player at S13 of FIG. 7, the main CPU 41 executes a to-be-stopped-symbols determination processing (S14). At the to-be-stopped-symbols determination process, the main CPU 41 determines symbols to be displayed through the display windows 15 when spinning of symbols in the display regions 28 (28*a* through 28*e*) is stopped, by executing the to-be-stopped-symbols determination program stored in the RAM 43. Thereby, a symbol combination to be stopped and displayed on the pay line L is determined.

Figure 19A:
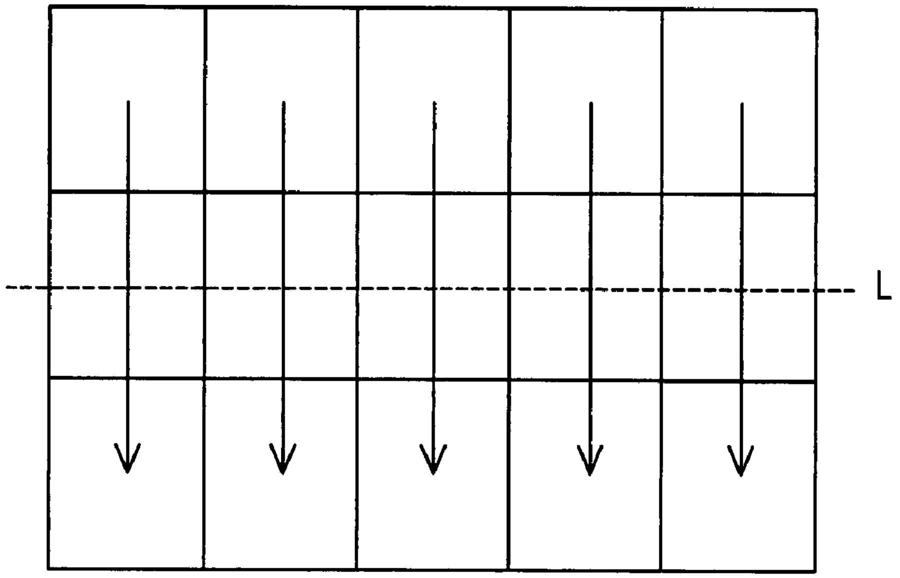
FIG. 19A is a display example when symbols are spinning.

Next, the main CPU 41 executes a spinning-state-symbols display processing (S15). This processing is to stop and display symbols in the display regions 28 (28*a* through 28*e*) in such a manner that symbols determined at S14 should be stopped and displayed on the pay line L after spinning of symbols as shown in FIG. 19A, for example, is started in the display regions 28 (28*a* through 28*e*).

Figure 19B:
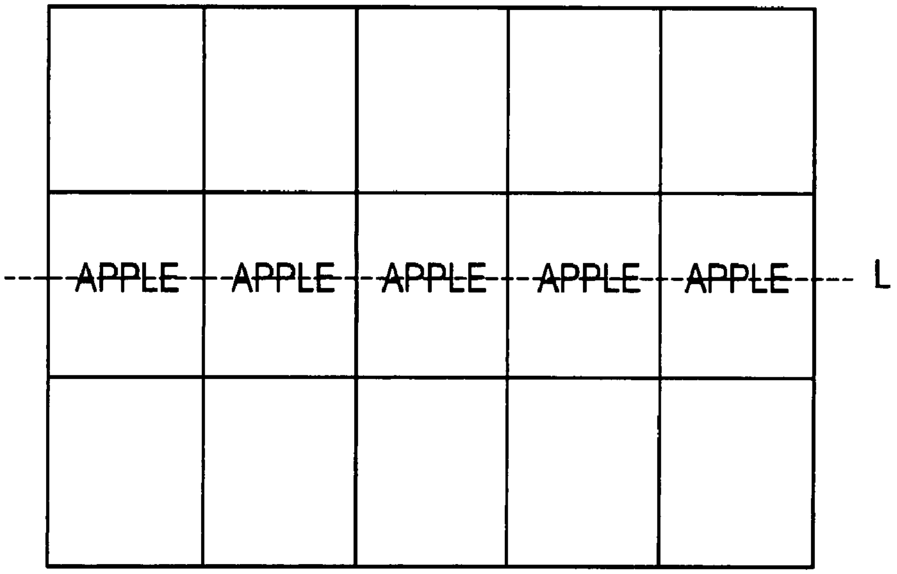
FIG. 19B is a display example when a winning symbol combination consisting of "APPLE" symbols is displayed on the pay line.

Next, the main CPU 41 judges whether or not a bonus game trigger has been invoked, i.e., whether or not a symbol combination consisting of five "APPLE" symbols has been stopped and displayed on the pay line L, for example, as shown in FIG. 19B (S16). In case it is judged that a bonus game trigger has been invoked, the processing goes on to a bonus game processing to be described later (S17).

Figure 9:
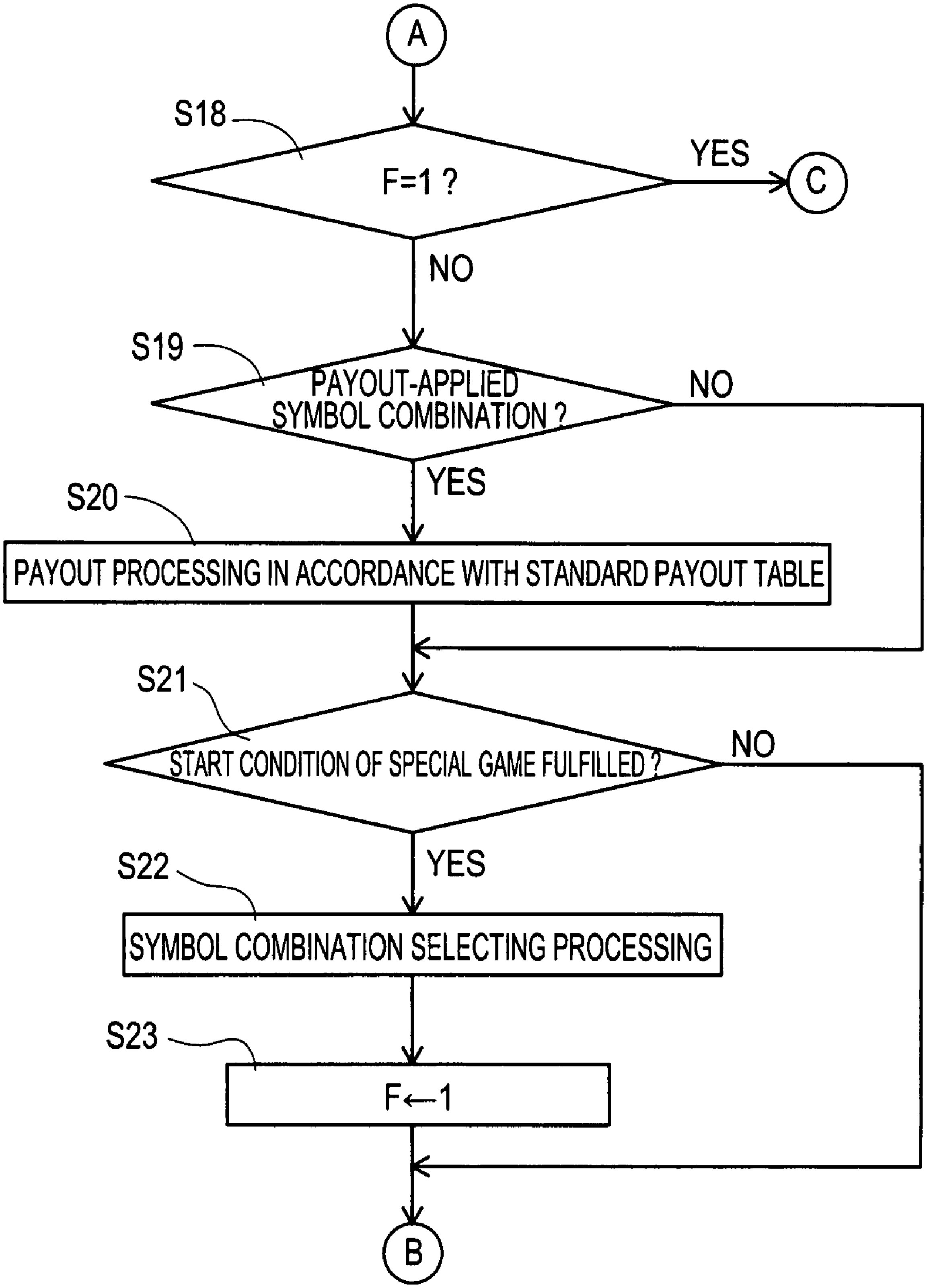
FIG. 9 is a flowchart showing other part of the base game procedures executed by the slot machine directed to the first embodiment.

In case it is judged that a bonus game trigger has not been invoked, the main CPU 41 checks whether or not the flag F in RAM 43 for indicating whether or not the payout variable game is being executed indicates "1" which is the number to indicate that the payout variable game is being executed (S18), as shown in the flowchart of FIG. 9.

In case the flag F is not "1", i.e., the payout variable game is not being executed (S18: NO), the main CPU 41 judges whether or not a symbol combination stopped and displayed in the display regions 28 coincides with a payout-applied symbol combination (S19).

Figure 19C:
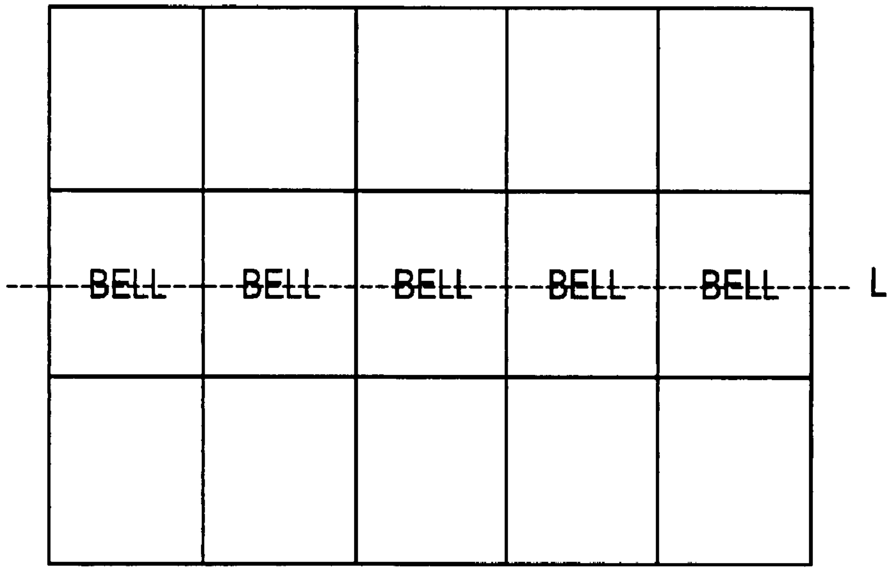
FIG. 19C is a display example when a winning symbol combination consisting of "BELL" symbols is displayed on the pay line.
Figure 19D:
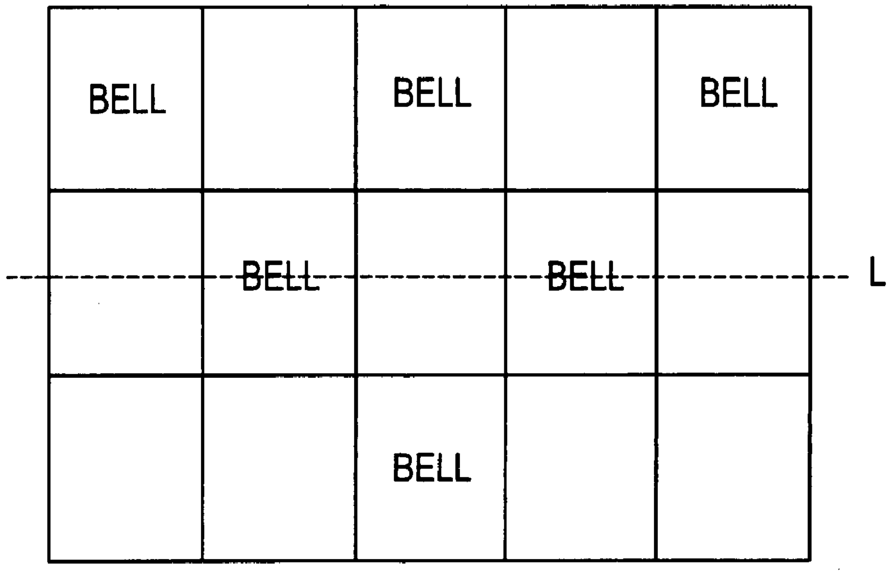
FIG. 19D is a display example when a symbol combination including a predetermined number of "BELL" symbols is displayed

It is possible to recognize that a symbol combination stopped and displayed in the display regions 28 is a payout-applicable symbol combination in case the symbol combination coincides with: a symbol combination consisting of "BELL" symbols alone or "PLUM" symbols alone stopped and displayed on the pay line L as shown in FIG. 19C or FIG. 18B; and a symbol combination including a predetermined number (six in FIG. 19D) of "BELL" symbols.

In case the symbol combination consisting of symbols stopped and displayed in the symbol display region 28 coincides with a payout-applied symbol combination (S19: YES), a payout processing for the symbol combination consisting of symbols stopped and displayed in the symbol display region 28 is executed in accordance with payout rate (payout amount) defined by the standard payout table of FIG. 4A (S20).

After that, the main CPU 41 judges whether or not start condition of the payout variable game is fulfilled (S21).

It is possible to determine that the start condition of the payout variable game is fulfilled, in case, for example, the random number value defined by a random number signal, which is generated by the main CPU 41 in accordance with the timing at which the spin button 23 is pressed by the player by executing a random number generating program included in the base game execution program, coincides with a winning random number programmed in advance.

In case the start condition of the payout variable game has not been fulfilled (S21: NO), the main CPU 41 terminates a base game execution processing and goes on to a next base game execution processing. In case the start condition of the payout variable game has been fulfilled (S21: YES), the main CPU 41 executes a symbol combination selecting processing (S22).

Figure 20A:
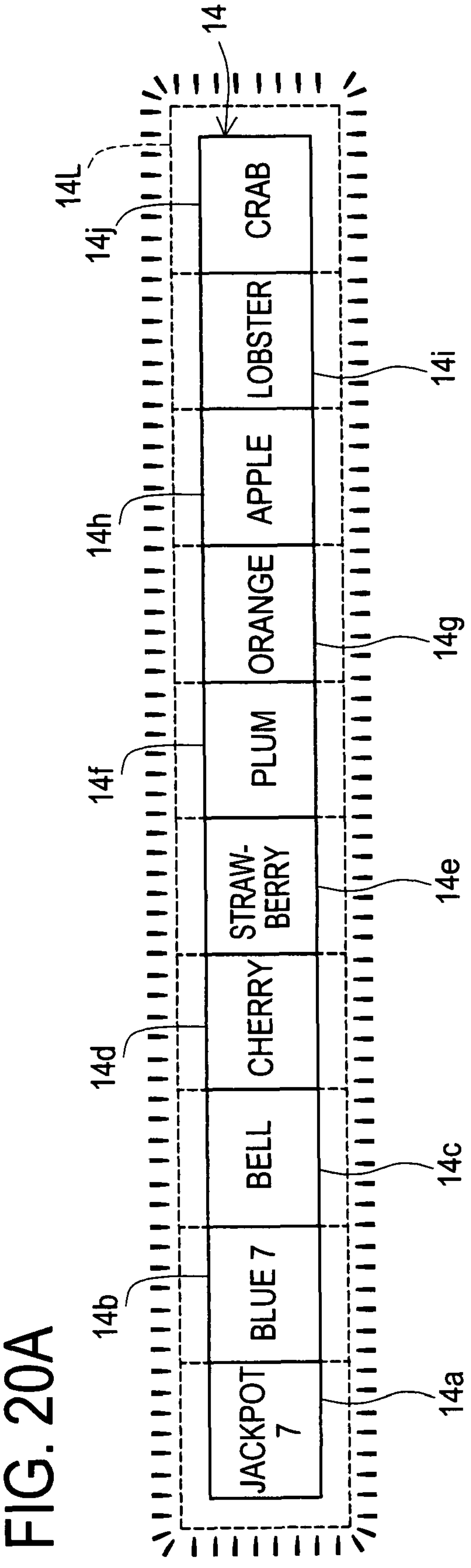
FIG. 20A is a display example of a symbol-combination selecting display when a start condition of a payout variable game is fulfilled.

This symbol combination selecting processing corresponds to a symbol combination selecting game described at S400 in FIG. 1. At the symbol combination selecting processing, the main CPU 41 firstly lights up all portions of the back light 14L to bring each of the symbol display regions 14*a* through 14*j* of the symbol-combination selecting display 14 into the lit-up (active state), as shown in FIG. 20A, and subsequently recognizes the symbol selected by the player by detecting the contact operation and the contact portion of the touch panel 69. Further on, the CPU 41 specifies the symbol combination consisting of five identical symbols selected by the player as specific symbol combination.

Figure 20B:
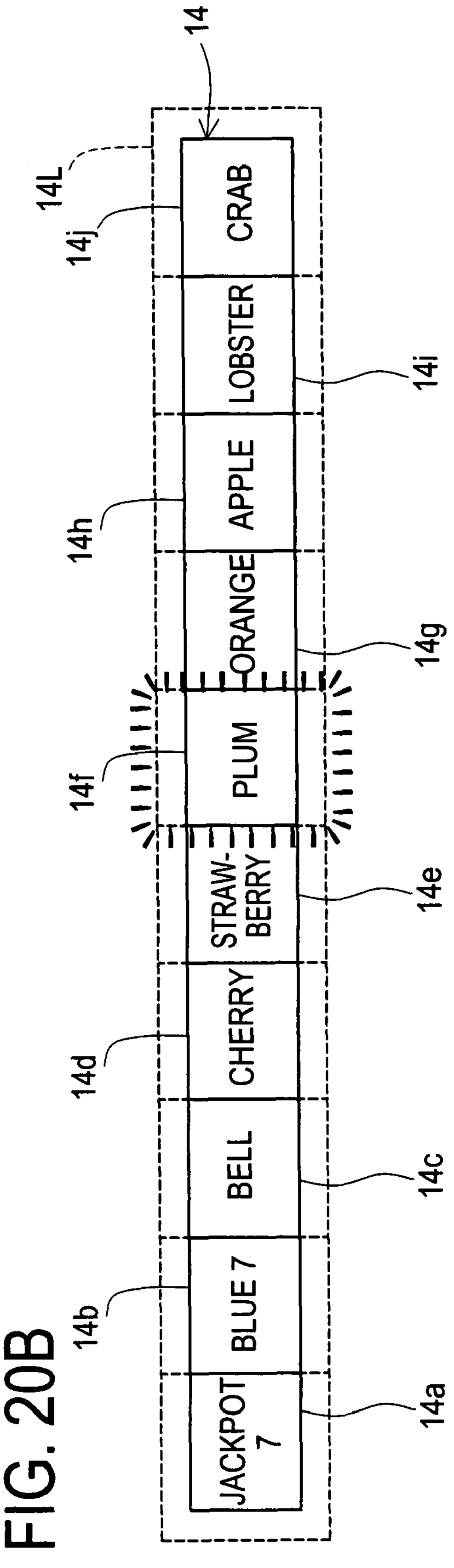
FIG. 20B is a display example of the symbol-combination selecting display after a specific symbol combination is selected by a player.

Next, as shown in FIG. 20B, the main CPU 41 turns off the portions of the back light 14L other than the portion corresponding to the symbol selected by the player and brings only the symbol display region 14*f* (or any one of the other symbol display regions 14*a* through 14*j*) corresponding to the symbol selected by the player into the lit-up state.

In this embodiment, description will be made hereafter provided that the player has selected a "PLUM" symbol. Accordingly, a symbol combination consisting of five "PLUM" symbols is regarded as the specific symbol combination selected by the player.

As described above, after recognizing a "PLUM" as player-selected symbol and executing the lighting-up display of the symbol "PLUM" to light up only the portion of the symbol display region 14*f* corresponding to "PLUM", the player-selected symbol, the main CPU 41 sets the flag F in the RAM 43 to "1" for indicating that the payout variable game is being executed (S23), terminates the current series of base game execution processing and goes on to a next series of base game execution processing.

Figure 10:
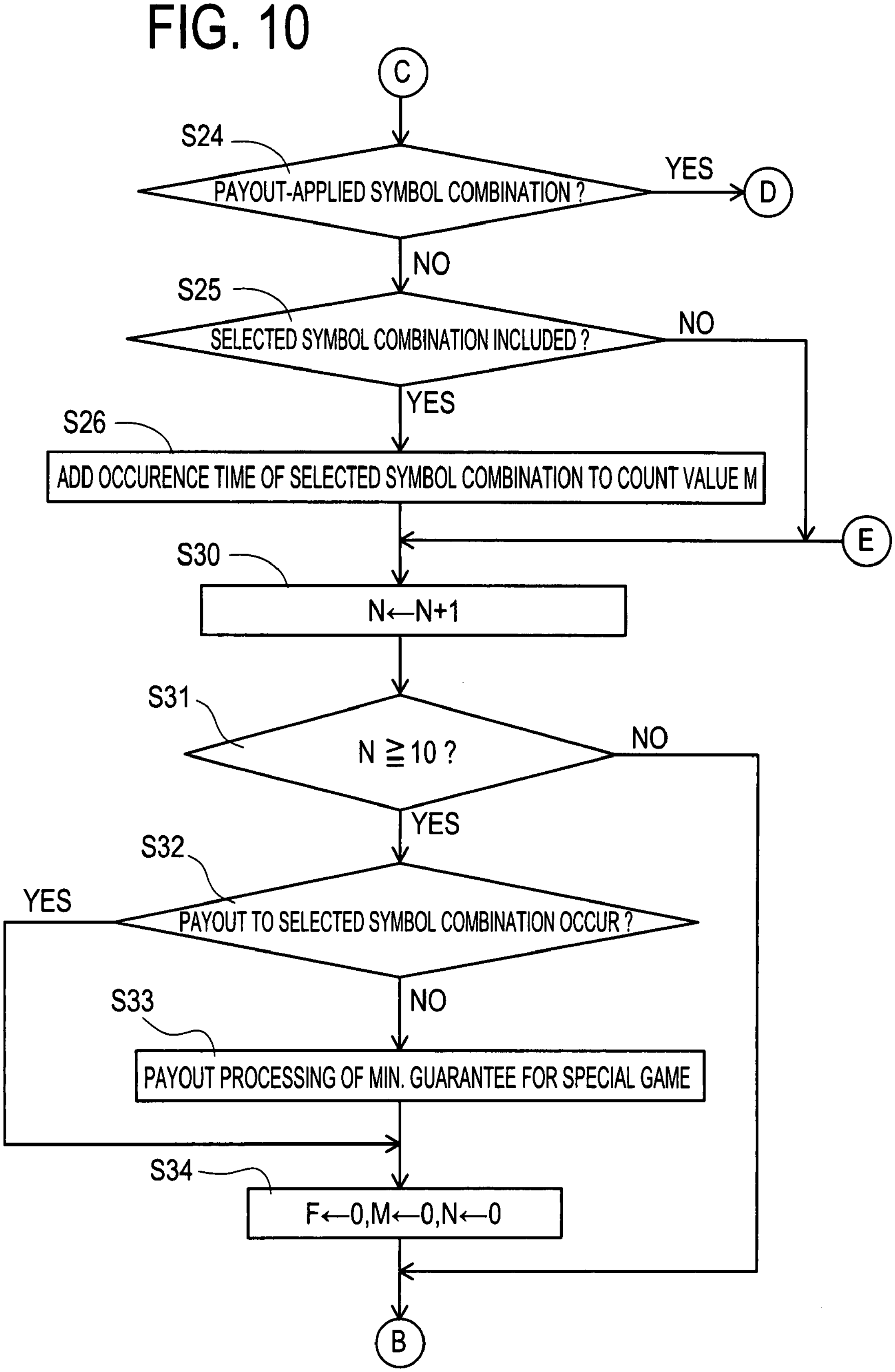
FIG. 10 is a flowchart showing other part of the base game procedures executed by the slot machine directed to the first embodiment.

In case a bonus game trigger has not been invoked (S16: NO, in FIG. 8) and the flag F in the RAM 43 is set to "1", that is, in case the payout variable game is being executed (S18: YES), the main CPU 41 judges whether or not a symbol combination consisting of symbols stopped and displayed in the display regions 28 coincides with a payout-applied symbol combination, as shown in the flowchart of FIG. 10 (S24).

In case a symbol combination consisting of symbols stopped and displayed in the display regions 28 does not coincides with a payout-applied symbol combination (S24: NO), the main CPU 41 judges whether or not there is included a symbol combination consisting of five "PLUM" symbols selected by the player by touching on the touch panel 69 in symbol combinations consisting of symbols stopped and displayed in the display regions 28 (S25).

It is to be noted that the above-mentioned case "there is included a symbol combination consisting of five "PLUM" symbols selected by the player by touching on the touch panel 69 in symbol combinations consisting of symbols stopped and displayed in the display regions 28" corresponds to a case that a symbol combination consisting of five "PLUM" symbols, the player-selected symbol, is arranged in a row on the top row of the five display windows 15, as shown in FIG. 18C, and a case that a symbol combination consisting of five "PLUM" symbols, the player-selected symbol, is arranged in a row on the bottom row of the five display windows 15.

In case, for example, the symbol combination consisting of five "PLUM" symbols selected by the player is included in symbol combinations consisting of symbols stopped and displayed in the display regions 28 (S25: YES), as shown in FIG. 18C, the number of occurrence times of the symbol combination consisting of five "PLUM" symbols selected by the player (one in case of FIG. 18C) is added (accumulated) to the current count value M of the specific-symbol-combination occurrence counter in the RAM 43 (S26).

Figure 11:
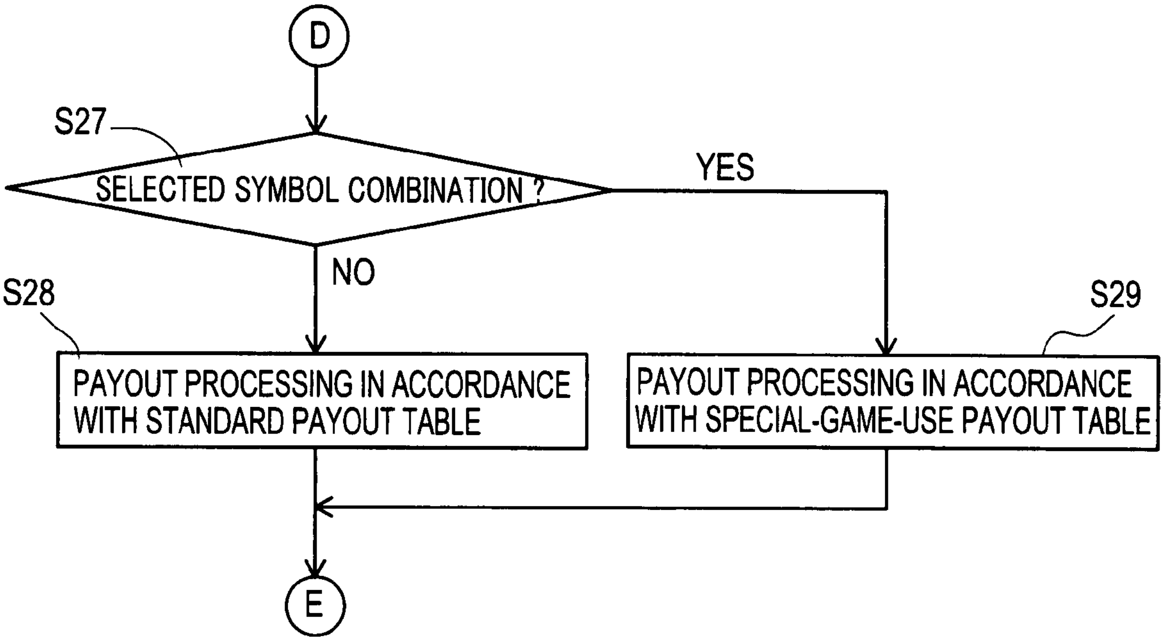
FIG. 11 is a flowchart showing other part of the base game procedures executed by the slot machine directed to the first embodiment.

On the other hand, in case the payout variable game is being executed (S18: YES, in FIG. 9) and a symbol combination consisting of symbols stopped and displayed in the display regions 28 coincides with a payout-applied symbol combination (S24: YES), the main CPU 41 judges whether or not it is a payout-applied symbol combination which consists of symbols stopped and displayed in the display regions 28 and coincides with the symbol combination consisting of five "PLUM" symbols selected by the player by touching on the touch panel 69 as shown in the flowchart of FIG. 11 (S27).

In case it is a symbol combination which consists of symbols stopped and displayed in the display regions 28 and coincides with a payout-applied symbol combination consisting of five identical non-specific symbols, other than the player-selected "PLUM" symbols, for example, the payout-applied symbol combination consisting of five "BELL" symbols on the pay line L as shown in FIG. 19C (S27: NO), the main CPU 41 executes a payout processing of the symbol combination consisting of symbols stopped and displayed in the display regions 28 in accordance with payout rate (payout amount) defined by the standard payout table of FIG. 4A (S28).

On the other hand, in case it is a symbol combination which consists of symbols stopped and displayed in the display regions 28 and coincides with a payout-applied symbol combination consisting of five player-selected "PLUM" symbols (S27: YES), the main CPU 41 executes a payout processing of the symbol combination consisting of five "PLUM" symbols stopped and displayed in the display regions 28 in accordance with payout rate defined by the payout-variable-game-use payout table of FIG. 4B in which the payout rate defined with the count value M counted by the specific-symbol-combination occurrence counter in the RAM 43 is applied (S29).

It is to be noted that the case "a payout-applied symbol combination coincides with a symbol combination consisting of five player-selected "PLUM" symbols", in this embodiment, corresponds to a winning symbol combination consisting of five player-selected "PLUM" symbols stopped and displayed on the pay line L of the display regions 28 as shown in FIG. 18B. However, provided that an only solo symbol combination can be selected without an overlap in a symbol combination selecting game, it is possible for the player to select a combination consisting of predetermined number (e.g., six in FIG. 18A) or more of player-selected "PLUM" symbols as specific symbol combination as shown in FIG. 18A, for example.

In case a payout variable game is being executed (S18: YES, in FIG. 9), irrespective of whether the symbol combination consisting of symbols stopped displayed in the display regions 28 coincides with a payout-applied symbol combination (S24: YES) or not (S24: NO), the main CPU 41 increments the count value N of the execution-times counter in the RAM 43 for indicating the number of execution times of the payout variable game by "1" (S30) and sequentially judges whether or not the count value N has reached "10", i.e., whether or not ten times of the payout variable game has been executed (S31).

In case it is judged that the count value N of the execution-times counter has reached "10" (S31: YES), the main CPU 41 regards that the number of execution times of the payout variable game has reached "10" and therefore judges whether or not a payout to a symbol combination consisting of five identical player-selected specific symbols has occurred during the ten payout variable games (S32). In case it is judged that a payout has never occurred (S32: NO), the main CPU 41 executes a payout processing of guaranteed minimum number of coins for the payout variable game defined in the payout-variable-game-use payout table of FIG. 4B (S33).

Figure 20C:
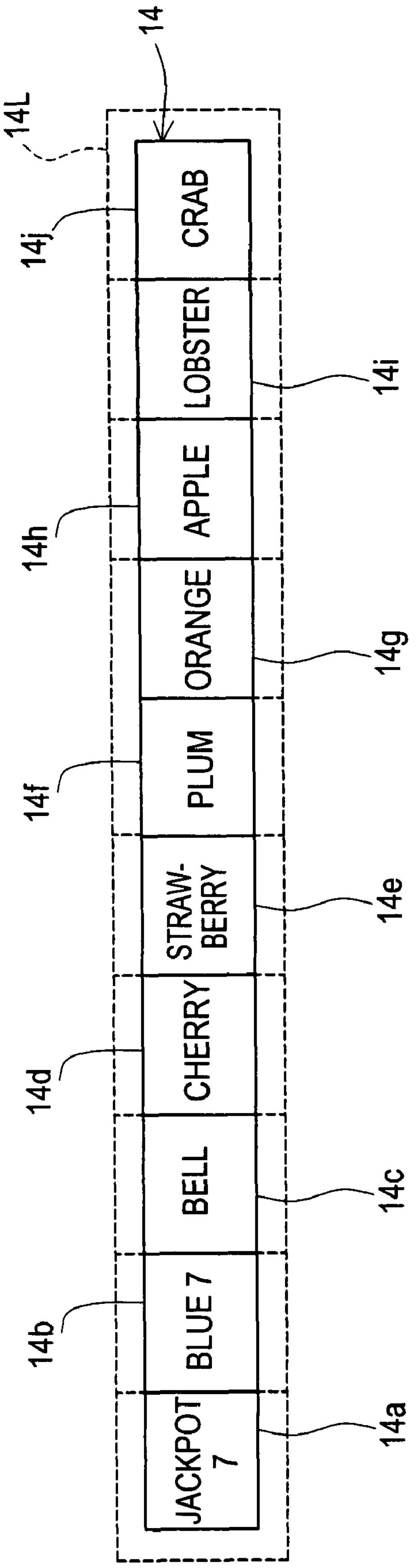
FIG. 20C is a display example of the symbol-combination selecting display when a payout variable game terminates.

After that, the main CPU 41 sets the flag F of the RAM 43 to "0" for indicating that the payout variable game is not being executed, and at the same time, resets both the count value M of the specific-symbol-combination occurrence counter in the RAM 43 and the count value N of the execution-times counter in the RAM 43 to "0", and as shown in FIG. 20C, turns off all portions of the back light 14L to bring each of the symbol display regions 14*a* through 14*j* of the symbol combination selecting display 14 into the unlit (inactive) state (S34). Thereby, the main CPU 41 terminates the payout variable game serving both as base game and shifts to a base game execution processing alone.

A base game and a payout variable game serving both as base game are thus executed.

In case of reserving coins to be paid out, the main CPU 41 adds equivalent number of credits to the number of credits recorded in the RAM 43. In case of paying out coins, in response to the player's pressing the CASHOUT button 25, the main CPU 41 transmits a control signal to the hopper 66 to pay out a predetermined number of coins. At this moment, the coin detecting section 67 counts the number of coins to be paid out from the hopper 66 and transmits a payout completion signal to the main CPU 41 when the counted number reaches a designated number. Thereby, the main CPU 41 stops driving the hopper 66 and terminates the coin payout processing.

Accordingly, in the slot machine 10 directed to the first embodiment, during execution of ten times of the payout variable game serving both as base games which are executed after the start condition of the payout variable game is fulfilled and a specific symbol combination (e.g., a symbol combination consisting of five "PLUM" symbols) is selected by the player, every time the specific symbol combination is stopped and displayed in the display regions 28 to increase the number of stopped-and-displayed times of the specific symbol combination, payout rate (payout amount) which is applied when the payout-applied specific symbol combination is stopped and displayed in the display regions 28 increases in such a multiplicative manner as 50 coins, 100 coins, 150 coins, 200 coins, 250 coins, 300 coins, 350 coins, 400 coins, 450 coins (this multiplicative increase is applied in case the specific symbol combination selected by the player is a symbol combination consisting of five "PLUM" symbols).

Next, there will be described details of the to-be-stopped symbols determination processing of S14 in FIG. 8 by referring to a flowchart of FIG. 12.

Figure 12:
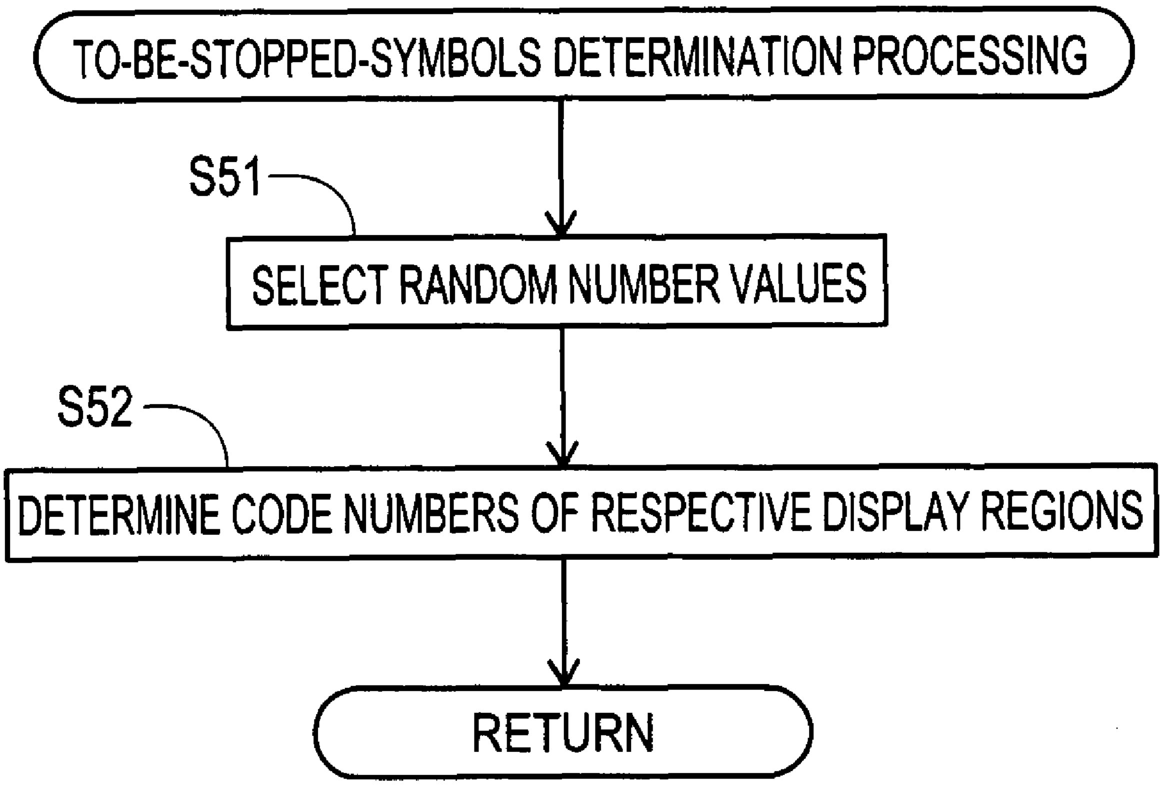
FIG. 12 is a flowchart showing procedures of a to-be-stopped-symbols determination processing executed by the slot machine in common with the first and second embodiments.

FIG. 12 shows the flowchart of the to-be-stopped symbols determination processing directed to S14 in FIG. 8. This processing is executed when the main CPU 41 executes the to-be-stopped-symbols determination program stored in the RAM 43.

Firstly, the main CPU 41 executes the random number generating program included in the to-be-stopped-symbols determination program to select random number values of respective display regions 28 (28*a* through 28*e*) from a numerical value range of 0 through 255 (S51).

Next the main CPU 41 refers to symbol weight data associated with payout rate setting data which is outputted form the GAL 54 and stored in the RAM 43 to determine code numbers (see FIG. 3) of the respective display regions 28 (28*a* through 28*e*) in accordance with selected five random number values (S52).

The code numbers of the respective display regions 28 (28*a* through 28*e*) correspond to code numbers of symbols to be stopped and displayed on a pay line L. The main CPU 41 determines a winning symbol combination by determining code numbers of the respective display regions 28 (28*a* through 28*e*). For example, in case code numbers of the display regions 28 (28*a*, 28*b*, 28*c*, 28*d* and 28*e*) are determined as "00", "00", "00", "00", and "00", respectively, it follows that the main CPU 41 has determined the winning symbol combination consisting of five "JACKPOT 7" symbols.

Figure 13:
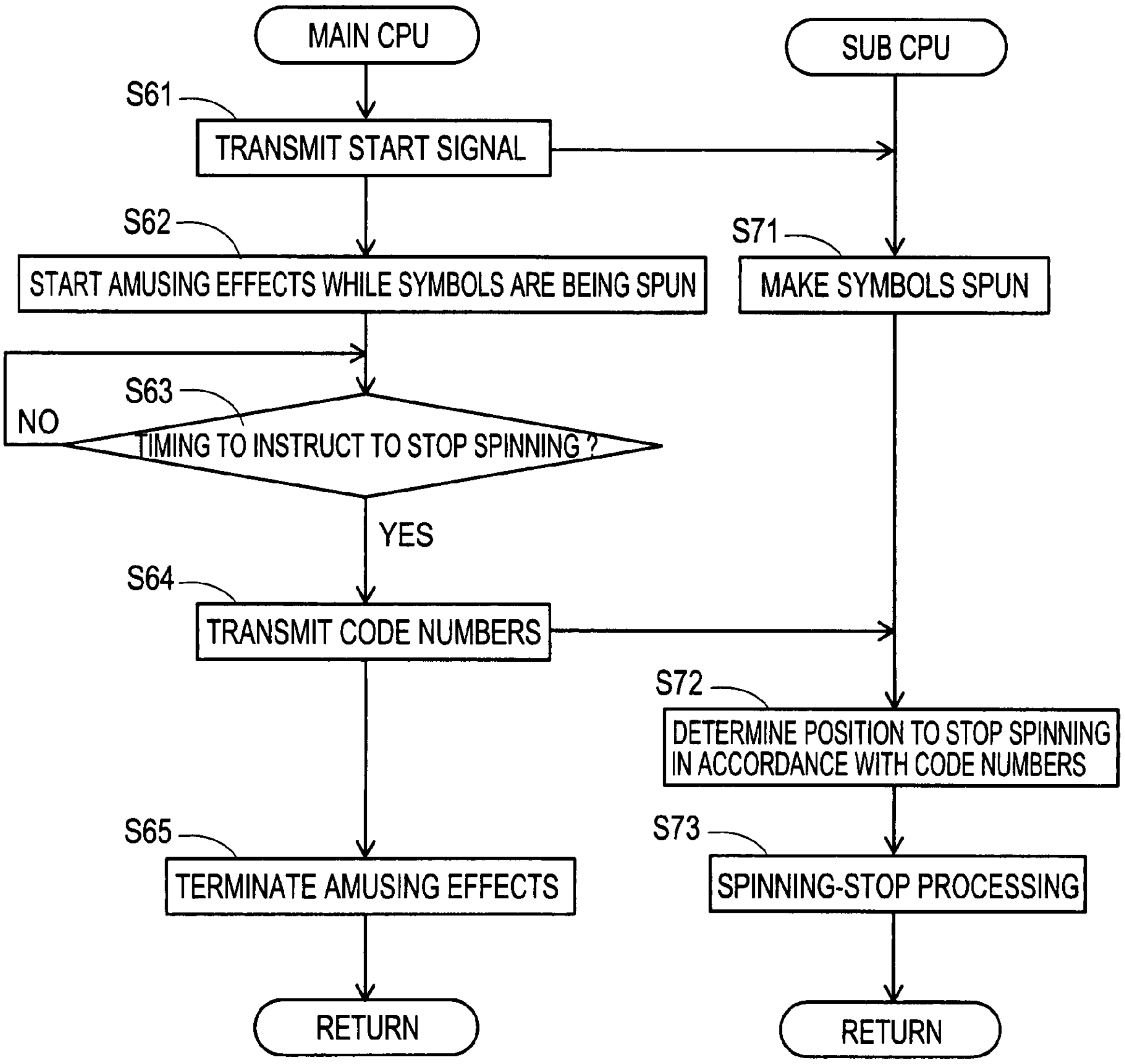
FIG. 13 is a flowchart showing procedures of a spinning-state-symbols display processing executed by the slot machine in common with the first and second embodiments.

FIG. 13 shows a flowchart of the spinning-state-symbols display processing directed to S15 in FIG. 8. It is to be noted that this processing is executed between the main CPU 41 and the sub CPU 61.

Firstly, the main CPU 41 transmits a start signal to the sub CPU 61 to start displaying spinning-state symbols in the display regions 28 of the liquid crystal display 17 (S61). Upon receipt of the start signal from the main CPU 41, the sub CPU 61 outputs a spinning-state-symbols display instruction to the VDP 46. Upon receipt of the instruction, the VDP 46 reads out image data of symbols stored in the image data ROM 47 and executes display of spinning-state symbols in five display regions 28 (28*a* through 28*e*) of the liquid crystal display 17 (S71). Thereby, spinning of symbols is started at each of the five display regions 28 (28*a* through 28*e*).

After transmitting the start signal to the sub CPU 61 at S61 in FIG. 13, the main CPU 41 executes amusing effects while symbols are being spun (S62). This processing is to keep displaying images in the lower display panel 16 and outputting sounds from the speaker 29 for a predetermined period (three seconds, for example) of time defined in accordance with the result of a to-be-stopped symbols determination processing (S14 in FIG. 8).

Next, the main CPU 41 judges whether or not it is a proper timing to instruct to stop spinning (S63 in FIG. 13) In case it is judged as not a proper timing to instruct to stop spinning at S63, the processing returns to S63 and the amusing effects are continually executed while symbols are spun. In case it is judged as a proper timing to instruct to stop spinning at S63, the main CPU 41 transmits code numbers of symbols recorded in the RAM 43 to the sub CPU 61 (S64). Upon receipt of the code numbers of the corresponding symbols from the main CPU 41, the sub CPU 61 determines the position to stop spinning in accordance with the code numbers (S72).

After that, a spinning-stop processing is executed, whereby the symbols are stopped and displayed in the display regions 28 (28*a* through 28*e*) provided inside of the display windows 15 (15*a* through 15*e*), respectively, (S73). In addition, amusing effects (animation effects) by the main CPU 41 are terminated (S65).

Figure 14:
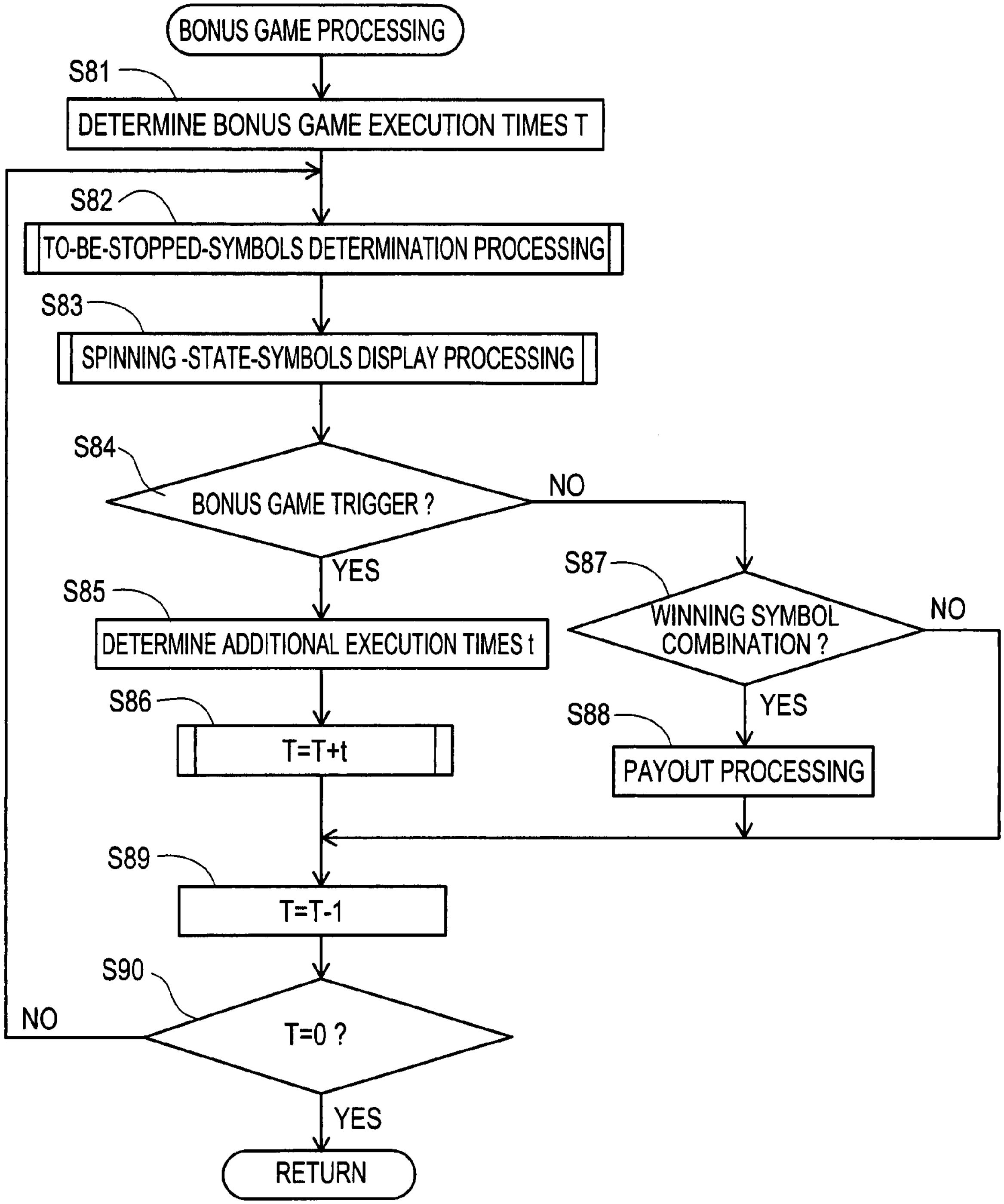
FIG. 14 is a flowchart showing procedures of a bonus game execution processing executed by the slot machine in common with the first and second embodiments.

FIG. 14 is a flowchart of the bonus game processing directed to S17 in FIG. 8. At the bonus game processing, firstly, the main CPU 41 determines the bonus-game-execution times T between 10 and 25 times in accordance with a random number value obtained by executing the random number generating program included in the to-be-stopped-symbols determination program stored in the RAM 43 (S81). The main CPU 41 stores data of the determined bonus-game-execution times T in the RAM 43.

Next, the main CPU 41 executes a to-be-stopped symbols determination processing (S82) and a spinning-state-symbols display processing (S83). The to-be-stopped symbols determination processing at S82 is substantially same as the processing described by referring to FIG. 12. The spinning-state-symbols display processing at S83 is substantially same as the processing described by referring to FIG. 13. Since the processing described above has already been described, duplicate description will be omitted here.

Next, in FIG. 14, the main CPU 41 judges whether or not a bonus game trigger has been invoked, i.e., whether or not the symbol combination consisting of five "APPLE" symbols is stopped and displayed on the pay line L formed on the display regions 28 (28*a* through 28*e*) provided inside of the display windows 15 (S84). In case it is judged that the bonus game trigger has been invoked (S84: YES), additional bonus-game-execution times "t" is newly determined (S85), and the determined additional bonus-game-execution times "t" is added to current bonus-game-execution times "T" (S86). Therefore, in case a new bonus game trigger is invoked in the middle of current execution of bonus games, remaining bonus-game-execution times increases.

In case it is judged that the bonus game trigger has not been invoked, the main CPU 41 judges whether or not a payout-applied symbol combination is stopped and displayed in the display regions 28 (S87).

It is possible to determine that a payout-applied symbol combination by the way that the winging symbol combination consisting of five identical the "BELL" symbols, "CHERRY" symbols or "PLUM" symbols, which is defined in the standard payout table in FIG. 4A, has been formed on the pay line L, or a combination including a predetermined number (e.g. six) or more of "BELL" symbols is stopped and displayed in the display regions 28.

In case it is judged that a payout-applied symbol combination is stopped and displayed in the display regions 28 (S87: YES), the main CPU 41 pays out credits depending on the number of coins inserted and the winning symbol combination (S88). At this time, the payout processing is executed in accordance with the standard payout table of FIG. 4A.

In case either S86 or S88 is executed or in case it is judged that none of payout-applied symbol combinations is stopped and displayed in the display regions 28 (judged as a loss of a game), the main CPU 41 reads out bonus-game-execution times T recorded in the RAM 43 and subtracts "1" from the read-out bonus-game-execution times T. After that, the subtracted bonus-game-execution times T is stored in the RAM 43 again (S89).

Next, the main CPU 41 judges whether or not the bonus-game-execution times T has reached the number of execution times determined at S81 (S90). To be more specific, it is judged whether or not the bonus-game-execution times T stored in the RAM 43 has come to 0. In case the bonus-game-execution times T is not 0, i.e., in case the number of execution times of the bonus game has not reached the number of times determined at S81, the processing returns to S82 and the above-described series of steps are repeated.

In case the bonus-game-execution times T is 0, i.e., in case it is judged that the number of execution times of the bonus game has reached the number of times determined at S81, the processing terminates. A bonus game is thus executed.

As described, in the slot machine 10 directed to the first embodiment, once a series of the payout variable games is started and every time the specific symbol combination consisting five identical specific symbols (e.g., "PLUM") selected by the player is stopped and displayed to increase the number of stopped-and-displayed times of the specific symbol combination, there increases payout amount which is applied when the specific symbol combination with accompanying a payout of credits is stopped and displayed.

Therefore, the slot machine 10 directed to the first embodiment can further attract player's interest for the game by making the player expect a significant number of credits to be paid out when the payout variable games starts, because a number of credits to be paid out when a specific symbol combination with accompanying a payout of credits occurs becomes great depending on the number of stopped-and-displayed times of the specific symbol combination.

Furthermore, according to the slot machine 10 directed to the first embodiment, regarding winning possibility of symbol combinations with accompanying a payout of credits, there are plural symbol combinations with accompanying a payout of credits at same winning possibility as shown in FIG. 4A, which can bring the player fun to select a specific symbol combination.

Furthermore, regarding the large number of credits to be paid out depending on the number of stopped-and-displayed times of a specific symbol combination selected by the player, as shown in FIG. 4A and FIG. 4B, the larger is a payout rate (initial value) in accordance with the standard payout table directed to FIG. 4A, the smaller is an increase rate by a multiplication of a count value M in accordance with the payout-variable-game-use payout table directed to FIG. 4B, which can bring the player fun to select a specific symbol combination.

Incidentally, in the first embodiment, a case in which the payout variable game is executed ten times as a series is described. However, as variant of the first embodiment, a series of the payout variable game can be progressed in such a manner that, in case a symbol combination consisting of five identical specific symbols selected by the player is stopped and displayed in the display regions 28 as payout-applied symbol combination and a payout processing is executed in accordance with the payout rate of the payout-variable-game-use payout table in FIG. 4B during a series of the payout variable games, the series of the payout variable games is immediately terminated even if it is not executed ten times, and the game mode shifts to a base game mode.

There will be described the above-mentioned variant of the base game execution processing by referring to FIG. 15.

Figure 15:
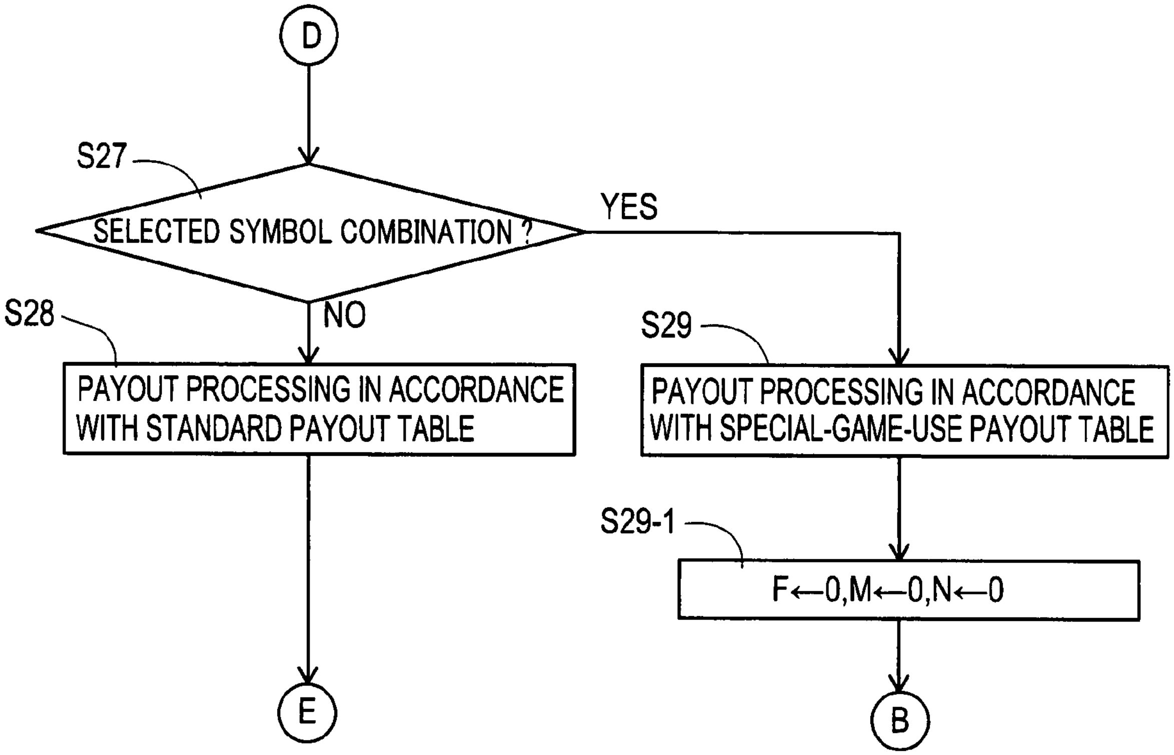
FIG. 15 is a flowchart showing a part of procedures of a variant base game executed by the slot machine directed to the first embodiment.

FIG. 15 is a flowchart showing a part of procedures directed to the variant of base game executed in the slot machine 10 directed to the first embodiment.

In the variant of the base game execution processing, after the payout processing of the symbol combination consisting of "PLUM" symbols stopped and displayed in the display regions 28 is executed at S29 of FIG. 11 in accordance with payout rate defined by both the payout-variable-game-use payout table of FIG. 4B and the count value M of the specific-symbol-combination occurrence counter in the RAM 43, the main CPU 41 executes the following series of processing.

Similar to the manner of S34 shown in FIG. 10, the main CPU 41 sets the flag F of the RAM 43 to "0" for indicating the payout variable game is not being executed, further resets both the current count value M of the specific-symbol-combination occurrence counter and the current count value N of the execution-times counter both provided in the RAM 43 to "0", and turns off all portions of the back light 14L to bring each of the symbol display regions 14*a* through 14*j* of the symbol combination selecting display 14 into unlit (inactive) state as shown in FIG. 20C (S29-1), whereby the payout variable game serving both as base game is terminated and the processing shifts to a base game execution processing alone.

In the inventive slot machine 10 which executes the above described variant of base game, once payout which never occurs in the base game alone occurs during a series of the payout variable game, the payout is regarded as fulfillment of the significance to execute the payout variable game and the game mode immediately shifts to a base game mode alone as result.

Similar to the slot machine 10 directed to the first embodiment, the slot machine 10 directed to the variant of the first embodiment can attract player's interest to games by making the player expect that a significant number of credits to be paid out when the payout variable game starts, because a number of credits to be paid out when a specific symbol combination with accompanying a payout of credits occurs becomes great depending on the number of stopped-and-displayed times of the specific symbol combination. Furthermore, similar to the first embodiment, the variant can bring the player fun to select a specific symbol combination.

Regarding the slot machine 10 directed to the first embodiment and the variant of the first embodiment, there is described a case in which a payout variable game serving both as base is executed. However, the present invention is applicable to a case in which the payout variable game is executed as second game.

Next, there will be described a slot machine directed to a second embodiment. Schematic structure of the slot machine directed to the second embodiment is substantially same as the slot machine directed to the first embodiment. Accordingly, basic construction of its internal and external will be complementarily described by referring to FIG. 2, FIG. 3, and FIG. 5 and numerical numbers thereof so as to avoid duplicated explanation.

The contents of the slot machine 10 directed to the second embodiment differ from those of the slot machine 10 directed to the first embodiment in a part of the processing executed mainly by the main CPU 41.

Regarding the procedural difference of the slot machine 10 directed to the second embodiments, a flag F for indicating whether or not a payout variable game is being executed is not provided in the RAM 43 of the mother board 40, and instead of the specific-symbol-combination occurrence counter for indicating the number of occurrence times of the specific symbol combination (except occurrence of the specific symbol combination with accompanying a payout of credits) consisting of five identical specific symbols selected by the player during the payout variable game, there is provided a second specific-symbol-combination occurrence counter for indicating the number of occurrence times of a specific symbol combination (restricted to occurrence of the specific symbol combination with accompanying a payout of credits) consisting of five identical player-selected specific symbols stopped and displayed in the display regions during a payout variable game.

Accordingly, it follows that the main CPU 41 of the slot machine 10 directed to the second embodiment resets both the count value S of the second specific-symbol-combination occurrence counter and the count value N of the execution times counter both provided in the RAM 43 to "0" at the time of initial setting at S3 directed to the flowchart of FIG. 7.

Furthermore, in the slot machine 10 directed to the second embodiment, instead of the standard payout table of FIG. 4A set to the slot machine 10 directed to the first embodiment, another standard payout table shown in FIG. 4C is applied to during the base game. This standard payout table of FIG. 4C is selected during an execution of the base game, whereas another payout-variable-game-use payout table is selected during an execution of the payout variable game.

Different from the standard payout table of FIG. 4A set to the slot machine 10 directed to the first embodiment, the standard payout table of FIG. 4C set to the slot machine 10 directed to the second embodiment defines a payout variable game starting trigger which is invoked when six "BELL" symbols are stopped and displayed in the five display regions 28 (28*a* through 28*e*).

Accordingly, in the slot machine 10 directed to the second embodiment, a base game mode shifts to a payout variable game mode as second game when six "BELL" symbols are stopped and displayed in the five display regions 28 (28*a* through 28*e*).

Furthermore, in the slot machine 10 directed to the second embodiment, instead of the payout variable-game-use payout table of FIG. 4B set to the slot machine 10 directed to the first embodiment, another payout-variable-game-use payout table shown in FIG. 4D is applied during the payout variable game. This payout-variable-game-use payout table is selected while a payout variable game is being executed but never selected while a base game is being executed.

The contents of the payout-variable-game-use payout table of FIG. 4D are those in which a guaranteed minimum payout number of two coins to be paid out for the payout variable games when the payout variable game is terminated is added to the standard payout table of FIG. 4C.

In the payout-variable-game-use payout table shown in FIG. 4D, each payout rate to be applied to each symbol combination consisting of five identical specific symbols selected by the player for commencing the payout variable game is multiplied by a count value S already described. In this regard, the payout-variable-game-use payout table of FIG. 4D is different form the standard payout table of FIG. 4C which is selected when a base game alone is being executed.

In this regard, the smaller is an increase rate determined by a multiple of the above-mentioned count value S which is applied to a symbol combination consisting of five identical specific symbols in accordance with the payout-variable-game-use payout table 4D, the larger is the counterpart payout rate (initial value) according to the standard payout table of FIG. 4C.

In case of changing payout rates of respective symbol combinations each of which consists of five identical specific symbols selected by the player with regard to the payout-variable-game-use payout table of FIG. 4D, the number of coins to be paid out can be made to increase in irrelevant to an integral multiple of a payout rate (initial value) according to the standard payout table of FIG. 4C as long as it is satisfied that the larger is a payout rate (initial value) according to the standard payout table of FIG. 4C, the smaller is an increase rate determined by a multiple of the above-described count value S.

There will be described processing procedures of the base game and the payout variable game executed in the slot machine 10 directed to the second embodiment by referring to flowcharts of FIG. 16 and FIG. 17, respectively.

Figure 16:
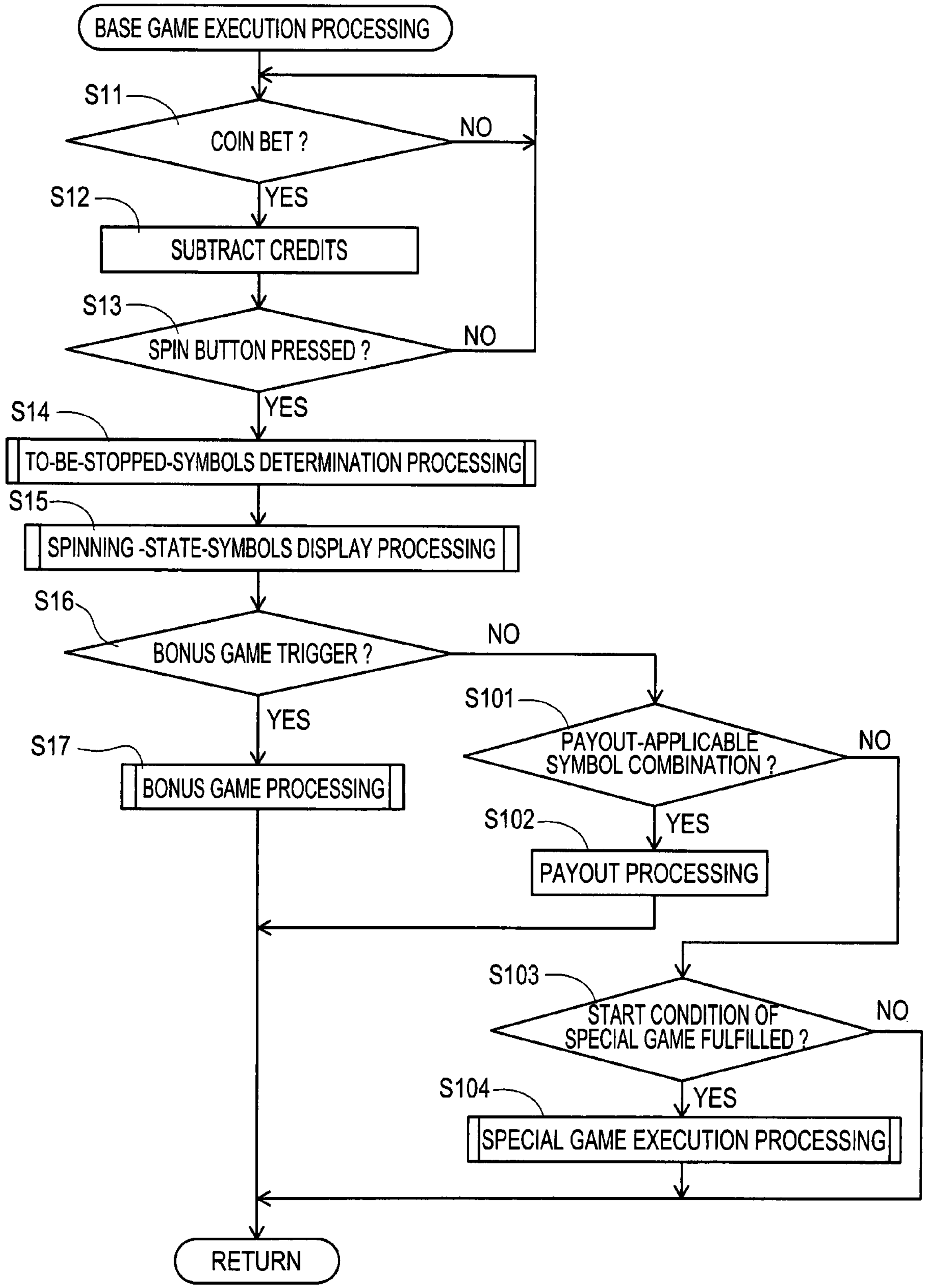
FIG. 16 is a flowchart showing procedures of a base game execution processing executed by the slot machine directed to the second embodiment.

FIG. 16 is a flowchart of the base game execution processing executed in the slot machine 10 directed to the second embodiment.

In the slot machine 10 directed to the second embodiment, the main CPU 41 executes a series of processing, namely, a judgment on whether or not a coin is bet (S11) through a judgment on whether or not a bonus game trigger has been invoked (S16) by the same processing procedures as that executed by the main CPU 41 in the slot machine 10 directed to the first embodiment shown in FIG. 8.

In case it is judged that the bonus game trigger has been invoked, the processing goes on to a bonus game processing to be described later (S17). In case it is judged that a bonus game trigger has not been invoked, the main CPU 41 judges whether or not a payout-applied symbol combination is stopped and displayed in the display regions 28 (S101)

It is possible to recognize that a symbol combination stopped and displayed in the display regions 28 is a payout-applicable symbol combination in case the symbol combination coincides with a symbol combination consisting of "BELL" symbols alone or "PLUM" symbols alone stopped and displayed on the pay line L as shown in FIG. 19C or FIG. 18B.

In case the symbol combination consisting of symbols stopped and displayed in the symbol display regions 28 coincides with a payout-applied symbol combination (S101: YES), a payout processing for the symbol combination consisting of symbols stopped and displayed in the symbol display region 28 is executed in accordance with payout rate (payout amount) defined by the standard payout table of FIG. 4C (S102).

In case the symbol combination consisting of symbols stopped and displayed in the symbol display regions 28 does not coincide with a payout-applied symbol combination (S101: NO), i.e., in case it is a losing symbol combination, the main CPU 41 judges whether or not the start condition of the payout variable game is fulfilled (S103).

It is possible to determine that start condition of the payout variable game is fulfilled in the slot machine 10 directed to the second embodiment, in case for example, similar to the slot machine 10 directed to the first embodiment, the random number value defined by a random number signal, which is generated by the main CPU 41 in accordance with the timing at which the spin button 23 is pressed by the player by executing a random number generating program included in the base game execution program, coincides with a winning random number programmed in advance.

However, here in this description, it is judged that the start condition of the pay out variable game of slot machine 10 directed to the second embodiment has been fulfilled by a phenomenon that a symbol combination including a predetermined number (six in FIG. 19D) of "BELL" symbols is stopped and displayed in the display regions 28, which is different from the one described for the slot machine 10 directed to the first embodiment.

In this case, instead of the standard payout table as shown in FIG. 4A, the standard payout table as shown in FIG. 4C is applied during execution of the base game. That is, the contents of the standard payout table of FIG. 4C includes definition of a payout variable game starting trigger which is invoked when a symbol combination including a predetermined number (e.g., six) of "BELL" symbols is stopped and displayed, in addition to the contents same as the standard payout table in FIG. 4A.

In case the start condition of the payout variable game is not fulfilled (S103: NO), the main CPU 41 terminates a base game execution processing and goes on to a next base game execution processing. In case the start condition of the payout variable game is fulfilled (S103: YES), the main CPU 41 executes a payout variable game execution processing (S104) and then, goes on to a next base game execution processing.

Figure 17:
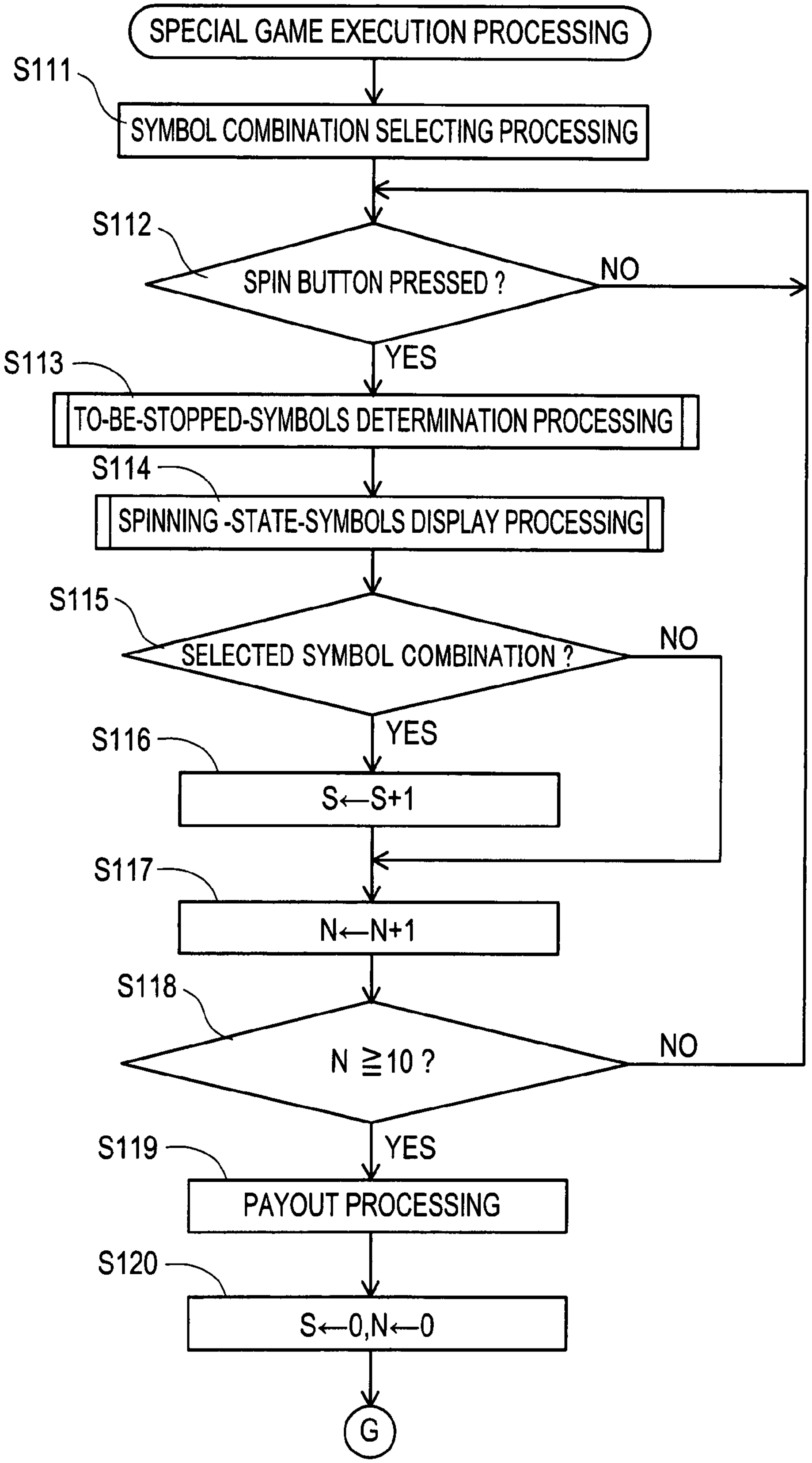
FIG. 17 is a flowchart showing a payout variable game execution processing executed by the slot machine directed to the second embodiment.

FIG. 17 shows a flowchart of the payout variable game execution processing indicated as S104 in FIG. 16. In the payout variable game execution processing, the main CPU 41 executes a symbol combination selecting processing (S111).

Similar to the slot machine 10 directed to the first embodiment, at the symbol combination selecting processing, the main CPU 41 firstly lights up all portions of the back light 14L to bring each of the symbol display regions 14*a* through 14*j* of the symbol-combination selecting display portion 14 into lit-up (active state), as shown in FIG. 20A, and subsequently recognizes the symbol selected by the player by detecting contact operation and the contact portion of the touch panel 69.

Next, as shown in FIG. 20B, the main CPU 41 turns off the portions of the back light 14L other than the portion corresponding to the symbol selected by the player and brings only the display region 14*f* (or any one of the other symbol display regions 14*a* through 14*j*) corresponding to the symbol selected by the player into the lit-up state.

In this embodiment, description will be made hereafter provided that the player has selected a "PLUM" symbol.

The main CPU 41 recognizes "PLUM" as the player-selected symbol and executing the lighting-up display of the symbol "PLUM" to light up only the portion of the symbol display region 14*f* corresponding to "PLUM", the player-selected symbol, the main CPU 41 keeps waiting until the spin button 23 is pressed by the player (S112).

In case it is judged that the spin button 23 is pressed by the player, the main CPU 41 executes a to-be-stopped symbols determination processing (S113) and a spinning-state-symbols display processing (S114). The processing at S113 is substantially same as the one described by referring to FIG. 12. The processing at S114*b* is substantially same as the one described by referring to FIG. 13. As already described, descriptions on S113 and S114 will be omitted herein.

In FIG. 17, the main CPU 41 judges whether or not a symbol combination consisting of five player-selected "PLUM" symbols as shown in FIG. 18C is stopped and displayed on the pay line L provided on the display regions 28 (S115). In case it is judged as the above such symbol combination is stopped and displayed on the pay line L (S115: YES), the main CPU 41 increments the count value S of the second specific-symbol-combination occurrence counter in the RAM 43 by "1" (S116).

Irrespective of whether the symbol combination consisting of five "PLUM" symbols is stopped and displayed in the display regions 28 or not, the main CPU 41 increments the count value N of the execution-times counter in the RAM 43 for indicating the number of execution times of the payout variable game by "1" (S117) and sequentially judges whether or not the count value N has reached "10", i.e., whether or not ten times of the payout variable game has been executed (S118).

In case it is judged that the count value N of the execution-times counter has not reached "10" (S118: NO), a series of processing steps S112 through S118 is repeated. In case it is judged that the count value N has reached "10" (S118: YES), the main CPU 41 regards that the number of execution times of the payout variable games has reaches "10" and therefore, executes a payout processing (S119).

The payout processing to the symbol combination consisting of five "PLUM" symbols stopped and displayed in the display regions 28 is executed in accordance with payout rate defined by the payout-variable-game-use payout table of FIG. 4D in which the payout rate defined with the count value S counted by the second specific-symbol-combination occurrence counter in the RAM 43 is applied (S119).

Provided that an only solo symbol combination can be selected without an overlap in a symbol combination selecting game, it is possible for the player to select a combination consisting of predetermined number (e.g., six in FIG. 18A) or more of player-selected "PLUM" symbols as specific symbol combination as shown in FIG. 18A, for example.

In case the symbol combination consisting of five "PLUM" symbols is never once stopped and displayed in the symbol display regions during the payout variable game (S=0), the main CPU 41 pays out two coins as minimum guaranteed payout for the payout variable game.

In case the symbol combination consisting of five "PLUM" symbols is stopped and displayed on the pay line L provided on the display regions 28 at least once during the payout variable game, the main CPU 41 increases the number of coins to be paid out in proportion to the number of stopped-and-displayed times of the symbol combination (i.e., in proportion to the count value S of the second specific-symbol-combination occurrence counter) such as 50 coins, 100 coins, 150 coins, 200 coins, 250 coins, 300 coins, 350 coins, 400 coins, 450 coins, 500 coins.

The payout processing by the main CPU 41 of the slot machine 10 directed to the second embodiment can be defined as a processing to vary payout amount to the (fulfillment of the start condition of) the payout variable game depending on the number of stopped-and-displayed times of the symbol combination consisting of five "PLUM" symbols, selected by the player at the beginning of the payout variable game, during ten times of the payout variable game.

Also, the payout processing by the main CPU 41 of the slot machine 10 directed to the second embodiment can be defined as a processing to vary payout amount to occurrence(s) of the symbol combination consisting of five "PLUM" symbols, selected by the player as specific symbol, depending on total occurrence times of the symbol combination consisting of five player-selected "PLUM" symbols which has occurred until the payout variable game terminates.

After that, the main CPU 41 resets both the count value S of the second specific-symbol-combination-occurrence counter in the RAM 43 and the count value N of the execution-times counter in the RAM 43 to "0", and turns off all portions of the back light 14L to bring each of the symbol display regions 14*a* through 14*j* of the symbol combination selecting display 14 into the unlit (inactive) state as shown in FIG. 20C (S120). Thereby, the main CPU 41 terminates the payout variable game and shifts to a base game execution processing alone.

A base game and a payout variable game serving both as base game are thus executed.

Therefore, the slot machine 10 directed to the second embodiment can further attract player's interest for the game by making the player expect a significant number of credits to be paid out when the payout variable game starts, because a number of credits to be paid out at the end of payout variable game can possibly be great depending on the number of award accompanied occurrence times of a specific symbol combination consisting of five identical specific symbols selected by the player.

Furthermore, according to the slot machine 10 directed to the second embodiment, regarding winning possibility of symbol combinations with accompanying a payout of credits, there are plural symbol combinations with accompanying a payout of credits at same winning possibility as shown in FIG. 4C, which can bring the player fun to select a specific symbol combination.

Furthermore, regarding the large number of credits to be paid out depending on the number of award-accompanied occurrence times of a specific symbol combination consisting of player-selected five identical specific symbols, as shown in FIG. 4C and FIG. 4D, the larger is a payout rate (initial value) in accordance with the standard payout table directed to FIG. 4C, the smaller is an increase rate by a multiplication of a count value S in accordance with the payout-variable-game-use payout table directed to FIG. 4D, which can bring the player fun to select a specific symbol combination.

It is to be noted that the present invention is not restricted to the above-described embodiments but, not to mention, it can be variously improved and changed within the scope not departing from the subject matter thereof.

For example, the controller of the present invention can be constituted by a CPU which executes various processing in accordance with programs like the slot machine 10 directed to the first and second embodiments, however, it is not restricted to CPU. For example, it is also possible to constitute a part of the controller constituted by using a custom IC (Integrated Circuit) such as an ASIC (Application Specific Integrated Circuit), or a DSP (Digital Signal Processor).

In addition, in the first embodiment, its variant, and second embodiment description is given provided that the specific symbol selected by the player at the beginning of the payout variable game is the "PLUM" symbol. However, it is also possible for the player to select one of the following symbols other than "PLUM", namely, "BELL", "CHERRY", "STRAWBERRY", "ORANGE", "APPLE", "LOBSTER", "CRAB", "BLUE7", and "JACKPOT7", as specific symbol at the beginning of the series of payout variable games.

In this case, when the CPU 41 judges that a symbol combination consisting of five identical symbols other than "PLUM", namely, among "BELL", "CHERRY", "STRAWBERRY", "ORANGE", "APPLE", "LOBSTER", "CRAB", "BLUE7", and "JACKPOT7" selected by the player at the beginning of the payout variable games, is stopped and displayed in the display regions 28, the main CPU 41 is sequentially executes a payout processing.

In the first embodiment and its variant, there have been described cases in which the payout variable game serves both as base game. However, it is also possible to configure such that a payout variable game can be execute by aborting a base game when the start condition of the payout variable game is fulfilled.

In such a game configuration, contents of processing steps to be executed by the main CPU 41 are changed to either one of them: (1) a modified flowchart of FIG. 11 or FIG. 15 from which S28 is omitted; or (2) instead of taking sequential judgment steps from (S24:YES) in FIG. 10 to S27 in FIG. 11 or FIG. 15 or sequential steps from (S24:NO) to S25 in FIG. 10 either one of which intends to judge whether or not the payout-applied combination consisting of five "PLUM" symbols selected by the player by operating the touch panel 69 is stopped and displayed in the display regions 28, taking modified sequential judgment steps from (S24: YES) in FIG. 10 to S29 in FIG. 11 or FIG. 15 directly and taking sequential judgment steps from (S24: NO) to S25 in FIG. 10.

What is claimed is:

1. A slot machine comprising:

a display which has plural display regions and displays symbol combinations every game by repositioning symbols that have been positioned in the plural display regions; and a controller which is programmed to operate with the display (a) to execute a symbol combination selecting game in which a specific symbol combination is selected from plural symbol combinations by means of an external input;

(b) to execute a predetermined number of times of unit game after execution of the operation (a); and (c) when a payout variable game is executed by making use of the predetermined number of times of unit game which is being executed in accordance with the operation (b), (1) to vary a number of credits to be paid out to an award-accompanied occurrence of the specific symbol combination depending on number of award-not-accompanied occurrence times of the specific symbol combination, or (2) to vary a number of credits to be paid out at a termination of the payout variable game depending on number of award-accompanied occurrence times of the specific symbol combination.

2. A slot machine according to claim 1, wherein, for executing the operation (c), the controller is programmed:

(1) to increase the number of credits to be paid out to the award-accompanied occurrence of the specific combination in proportion to increase in the number of award-not-accompanied occurrence times of the specific symbol combination, or (2) to increase the number of credits to be paid out at the termination of the payout variable game in proportion to increase in the number of award-accompanied occurrence times of the specific symbol combination.

3. A slot machine according to claim 1, wherein, for executing the operation (c), the controller is programmed:

(1) to vary the number of credits to be paid out to the award-accompanied occurrence of the specific symbol combination depending on the number of award-not-accompanied occurrence times of the specific symbol combination, and (2) to terminate the payout variable game at time of the award-accompanied occurrence of the specific symbol combination.

4. A slot machine according to claim 1, wherein, for executing the operation (c), the controller is programmed:

(1) to vary the number of credits to be paid out at the termination of the payout variable game depending on the number of award-accompanied occurrence times of the specific symbol combination, and (2) to set payout the number of credits to be paid out at the termination of the payout variable game to a predetermined minimum number in case the number of award-accompanied occurrence times of the specific symbol combination is zero.

5. A slot machine according to claim 1, wherein, for executing the operation (c), the controller is programmed to provide various numerical valued possibility of award-accompanied occurrence for the plural symbol combinations and assign same numerical valued possibility of award-accompanied occurrence to two or more of symbol combinations among the plural symbol combinations.

6. A slot machine according to claim 1, wherein, for executing the operation (c), the controller is programmed to reduce increasing rate with regard to the number of credits to be paid out to the award-accompanied occurrence of the plural symbol combination as an initial value is larger.

7. A slot machine comprising:

a display which has plural display regions and displays symbol combinations every game by repositioning symbols that have been positioned in the plural display regions; and a controller which is programmed to operate with the display (a) to execute a symbol combination selecting game in which a specific symbol combination is selected from plural symbol combinations by means of an external input;

(b) to execute a predetermined number of times of unit game after execution of the operation (a); and (c) when a payout variable game is executed by making use of the predetermined number of times of unit game which is being executed in accordance with the operation (b), (1) to increase a number of credits to be paid out to the award-accompanied occurrence of the specific combination in proportion to increase in the number of award-not-accompanied occurrence times of the specific symbol combination, or (2) to increase a number of credits to be paid out at the termination of the payout variable game in proportion to increase in the number of award-accompanied occurrence times of the specific symbol combination.

8. A slot machine according to claim 7, wherein, for executing the operation (c), the controller is programmed:

(1) to increase the number of credits to be paid out to the award-accompanied occurrence of the specific symbol combination depending on increasing the number of award-not-accompanied occurrence times of the specific symbol combination, and (2) to terminate the payout variable game at time of the award-accompanied occurrence of the specific symbol combination.

9. A slot machine according to claim 7, wherein, for executing the operation (c), the controller is programmed:

(1) to increase the number of credits to be paid out at the termination of the payout variable game depending on increase in the number of award-accompanied occurrence times of the specific symbol combination; and (2) to set payout the number of credits to be paid out at the termination of the payout variable game to predetermined minimum amount in case the number of award-accompanied occurrence times of the specific symbol combination is zero.

10. A slot machine according to claim 7, wherein, for executing the operation (c), the controller is programmed to provide various numerical valued possibility of award-accompanied occurrence for the plural symbol combinations and assign same numerical valued possibility of award-accompanied occurrence to two or more of symbol combinations among the plural symbol combinations.

11. A slot machine according to claim 7, wherein, for executing the operation (c), the controller is programmed to reduce increasing rate with regard to the number of credits to be paid out to the award-accompanied occurrence of the plural symbol combination as an initial value is larger.

12. A slot machine comprising:

a display which has plural display regions and displays symbol combinations every game by repositioning symbols that have been positioned in the plural display regions; and a controller which is programmed to operate with the display (a) to execute a symbol combination selecting game in which a specific symbol combination is selected from plural symbol combinations by means of an external input;

(b) to execute a predetermined number of times of unit game after execution of the operation (a);

(c) when a payout variable game is executed by making use of the predetermined number of times of unit game which is being executed in accordance with the operation (b), (1) to increase a number of credits to be paid out to the award-accompanied occurrence of the specific combination in proportion to increase in the number of award-not-accompanied occurrence times of the specific symbol combination, and (2) to terminate the payout variable game at time of the award-accompanied occurrence of the specific symbol combination, and (d) for executing the operation (c), (1) to provide various numerical valued possibility of award-accompanied occurrence for the plural symbol combinations and assign same numerical valued possibility of award-accompanied occurrence to two or more of symbol combinations among the plural symbol combinations, and (2) to reduce increasing rate with regard to a number of credits to be paid out to the award-accompanied occurrence of the plural symbol combination as an initial value is larger.

13. A slot machine comprising:

a display which has plural display regions and displays symbol combinations every game by repositioning symbols that have been positioned in the plural display regions; and a controller which is programmed to operate with the display (a) to execute a symbol combination selecting game in which a specific symbol combination is selected from plural symbol combinations by means of an external input;

(b) to execute a predetermined number of times of unit game after execution of the operation (a);

(c) when a payout variable game is executed by making use of the predetermined number of times of unit game which is being executed in accordance with the operation (b), (1) to increase a number of credits to be paid out to the award-accompanied occurrence of the specific combination in proportion to increase in the number of award-not-accompanied occurrence times of the specific symbol combination, and (2) to set payout a number of credits to be paid out at the termination of the payout variable game to predetermined minimum amount in case the number of award-accompanied occurrence times of the specific symbol combination is zero, and (d) for executing the operation (c), (1) to provide various numerical valued possibility of award-accompanied occurrence for the plural symbol combinations and assign same numerical valued possibility of award-accompanied occurrence to two or more of symbol combinations among the plural symbol combinations, and (2) to reduce increasing rate with regard to the number of credits to be paid out to the award-accompanied occurrence of the plural symbol combination as an initial value is larger.

* * * * *